Oct. 26, 1965 J. E. SCHRAMECK ETAL 3,214,540
INTERRUPTING STRUCTURES AND CONTROL FOR COMPRESSED-GAS
CIRCUIT INTERRUPTERS
Filed Oct. 3, 1960 15 Sheets-Sheet 5
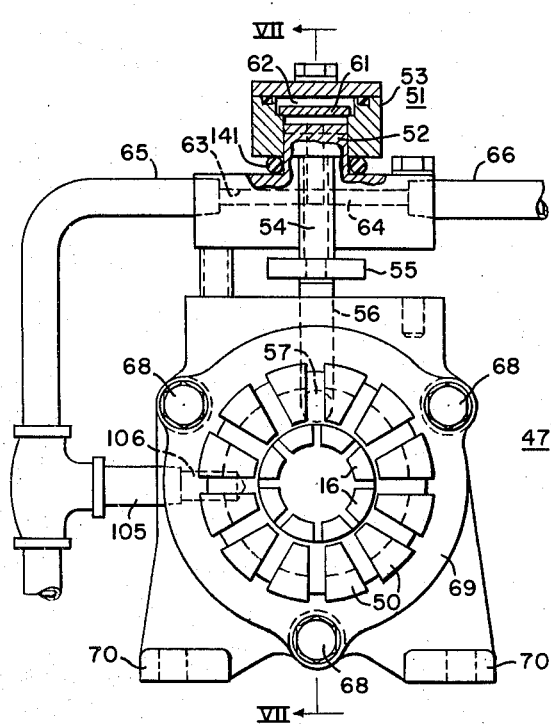
Fig. 6
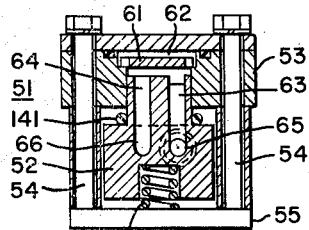
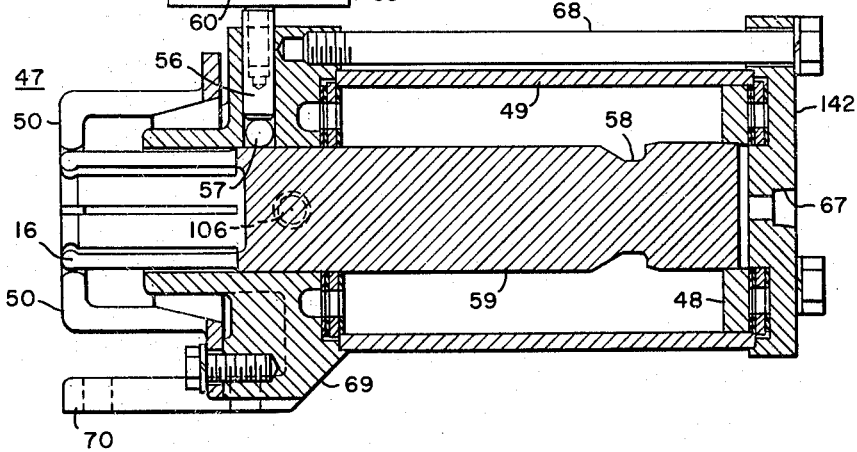
Fig. 7

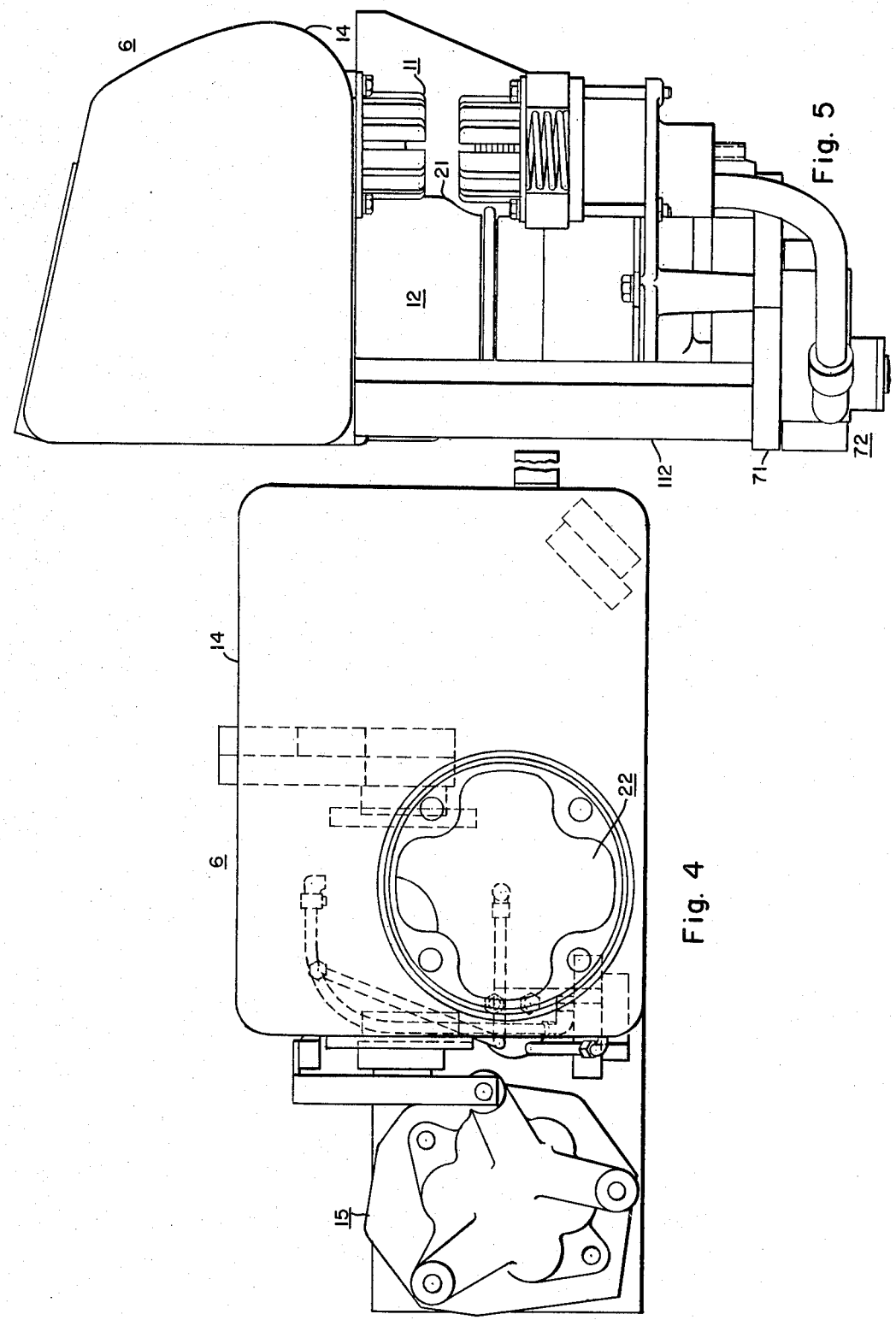

BREAKER CLOSED POSITION

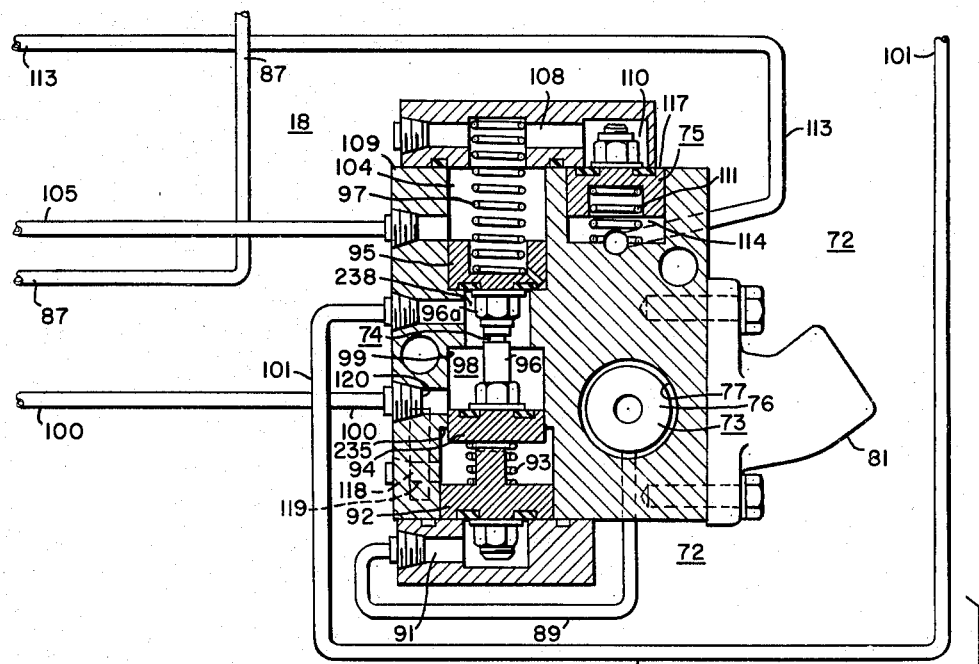

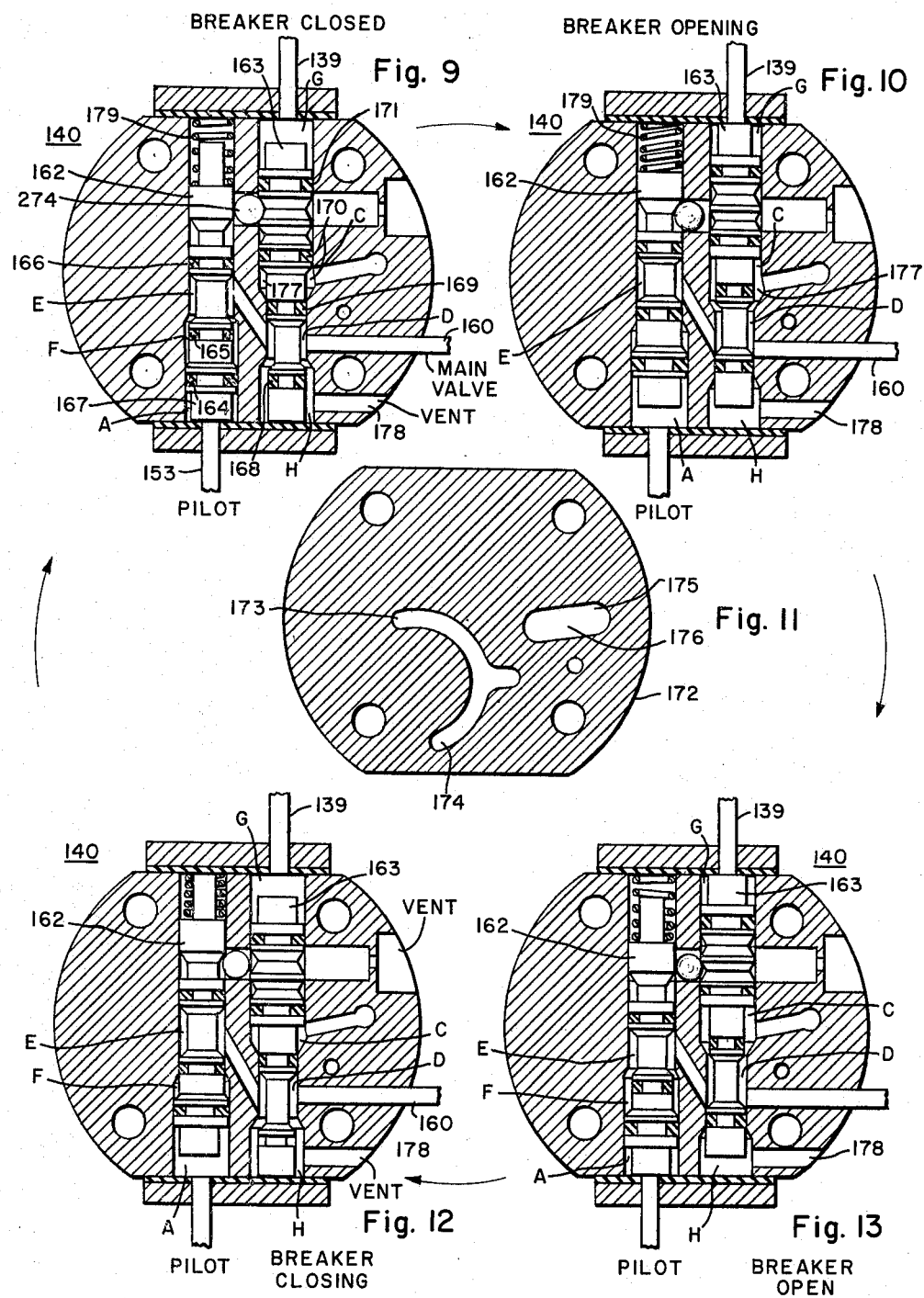

| BREAKER ELEMENTS | BREAKER CLOSED | BREAKER OPENING | BREAKER FULLY OPEN | BREAKER CLOSING |
|---|---|---|---|---|
| LINE 87 | P | X | X | P |
| EXHAUST VALVE 122 | U & P | D | D | U & P |
| PISTON 92 | U | D | D | U |
| LINE 89 | P | X | X | P |
| PISTONS 94, 95 | U | U & D | D | U |
| PISTON 76 | U | U & D | D | U |
| SEQUENCE VALVE 51 | F | O | O | O |
| LINE 81 | P | X | P | P |
| LINE 105 | X | X & P | P | P |
| VALVE PISTON 75 | U | U & D | U | U |
| LINE 100 | P | X | X | P |
| SENSING LINE 84 | X | X & P | P | X |
| LINE 130 | P | X | X | P |
| ISOLATOR 16 | C | OPENING | O | CLOSING |
| CONTACTS 11, 12, 13 | C | OPENING | C | CLOSING |
| REGION-G | X | X | P | P |
| CONTROL SPOOL 162 | D | U | D | U |
| ACTUATOR SPOOL 163 | D | U | U | D |
| PILOT VALVE 143 | C & X | O & P | C & X | O & P |
| MAIN VALVE 144 | O & HP | C & X | C & X | O & HP |
| MAIN VALVE PISTON 159 | X | P | P | X |
| CONTROL COIL 148 | DE | E | DE | E |
| LINE 113 | P | P & X | P | P |
| FIG. SEQUENCE | FIG. 9 | FIG. 10 | FIG. 13 | FIG. 12 |

P = PRESSURIZED   F = FLOATING
X = EXHAUSTED    E = ENERGIZED
D = DOWN         DE = DENERGIZED
U = UP           HP = HIGH PRESSURE
O = OPEN         C = CLOSED

Fig. 15

3,214,540
INTERRUPTING STRUCTURES AND CONTROL FOR COMPRESSED-GAS CIRCUIT INTERRUPTERS
Jack E. Schrameck, Pittsburgh, and Hayes O. Dakin, Jr., Irwin, Pa., assignors to Westinghouse Electric Corporation, East Pittsburgh, Pa., a corporation of Pennsylvania
Filed Oct. 3, 1960, Ser. No. 59,882
40 Claims. (Cl. 200—145)

This invention relates to compressed-gas circuit interrupters in general, and, more particularly, to improved interrupting structures with improved electrical and pneumatic control therefor.

A general object of the present invention is to provide an improved compressed-gas circuit interrupter of compact dimensions and utilizing a simplified control.

Another object of the present invention is to provide an improved compressed-gas circuit interrupter of the pressurized-tank type in which improved arc-extinguishing units are utilized for quickly interrupting the connected circuit through the interrupter.

Another object of the present invention is to provide an improved simplified control suitable for simultaneously controlling a number of circuit-interrupting units, the latter being positioned within a pressurized tank.

Another object of the present invention is to provide an improved disconnecting-switch structure operated in timed relation to the interrupting units to afford an isolating break within the circuit interrupter, and thereby permitting reclosure of the arcing contact structure.

In United States patent application filed April 18, 1958, Serial No. 729,368, now U.S. Patent 3,009,042, issued November 14, 1961 to Jack E. Schrameck and Richard E. Kane, and assigned to the assignee of the instant application, there is illustrated and claimed an improved compressed-gas circuit interrupter involving a grounded pressurized tank, within which are disposed arc-extinguishing structures associated with the three phases of a transmission system. In the aforesaid patent application an improved means was provided for dumping the compressed air in back of the main arcing contact to permit the circuit to be interrupted and for permitting the blast gases to be exhausted through a hollow terminal bushing. A serially-related disconnecting switch structure was actuated following a predetermined time delay after the opening of the arcing contacts to permit subsequent reclosure of the arcing contacts and cessation of the gas blast following opening of the disconnecting contacts. It is a purpose of the present invention to improve upon the interrupting structure set forth in the aforesaid patent application rendering it more effective and improving the arc-extinguishing structures with the important addition of a simplified control scheme therefor.

Another object of the present invention is to provide a simplified electrical control scheme for a compressed-gas circuit interrupter utilizing preferably only a single solenoid valve which is energized to close the circuit breaker and is energized again to open the circuit breaker.

Still a further object of the present invention is to provide an index-adapter valve assembly in combination with the pilot and main valve assemblies so that the operating coils may be de-energized in the normally open and normally closed-circuit positions of the circuit interrupter.

Still a further object of the present invention is to provide an improved pneumatic control system for continuously pressurizing or continuously maintaining at atmospheric pressure the control system with the important advantage of maintaining the electrical control continuously de-energized in the open and closed-circuit positions of the circuit interrupter.

Another object of the invention is to provide an improved indicating arrangement for indicating the open and closed-circuit positions of a circuit interrupter without mechanical interconnection with the interrupting units.

Still another object of the present invention is to provide an improved control valve assembly, or pneumatic "brain" which distinguishes between no pressure and pressure in the breaker reservoir, which permits filling of the reservoir without leakage to atmosphere, and yet provides exhaust to atmosphere to cause pressure differences which actuate the breaker moving parts.

Still a further object of the present invention is to provide an improved compressed-gas circuit interrupter involving internal-type disconnecting gaps separated in a high-pressure atmosphere in which the disconnecting contacts remain open or closed with loss of tank pressure.

Another object is to provide an improved sequencing valve operated in accordance with movement of the disconnecting contacts which operates to cause immediate reclosure of the blast valves with a minimum isolation spacing distance for the gaps. As a result, the air for a breaker operation can be held to a minimum.

Another object of the present invention is to provide an improved compressed-gas circuit interrupter in which the need for biasing springs is eliminated by having fast operation obtained by creating pressure differences on both sides of driving pistons. That is, pressure is built up on one side of a driving piston while it is being reduced on the other side thereof. This results in faster pressure differences across the driving pistons and hence faster breaker operation.

Another object of the present invention is to provide, in connection with a compressed-gas circuit interrupter, means for pneumatically interlocking the interrupting elements and for rapid repressurizing of exhausted volumes to cause rapid reclosing of blast valves to minimize air consumption.

Still a further object of the present invention is to provide an improved double-acting exhaust valve with exhaust ports so proportioned and so located as to provide minimum time in exhausting air. Preferably, the exhaust valve is double-acting in that it reverses position and delivers high-pressure air directly to the interrupters, when needed, so as to minimize the energy loss associated with other schemes utilizing long connecting air lines.

Still another object of the invention is to provide an improved compressed-gas circuit interrupter in which a magnetic ring is provided in the circuit interrupter to cause a strong arc-centering magnetic field during circuit interruption.

Further objects and advantages will readily become apparent upon reading the following specification, taken in conjunction with the drawings, in which:

FIG. 4 is a top plan view of the circuit-interrupting element of FIG. 3;

FIG. 5 is an end elevational view of the circuit-interrupting element of FIG. 3, taken substantially along the line V—V of FIG. 3;

FIG. 6 is an end elevational view of the improved disconnecting switch structure of the present invention;

FIG. 7 is a vertical longitudinal sectional view taken through the improved disconnecting switch structure of FIG. 6, taken substantially along the line VII—VII of FIG. 6, with the disconnecting contacts being illustrated in the open-circuit position;

FIGS. 8A–8D illustrate collectively, and somewhat diagrammatically, the improved electrical and pneumatic control for the circuit-interrupting structure of the present invention, the interrupting contact structure being illustrated in the fully open-circuit position;

FIGS. 9–13 illustrate various positions and parts of the index-adapted control-valve assembly of the present invention;

FIG. 15 is a table indicating, for reasons of clarity, the positions and the condition of various elements and control lines for breaker closed, breaker opening, breaker fully open, and breaker closing positions of the circuit-interrupting structure;

Figure 1:
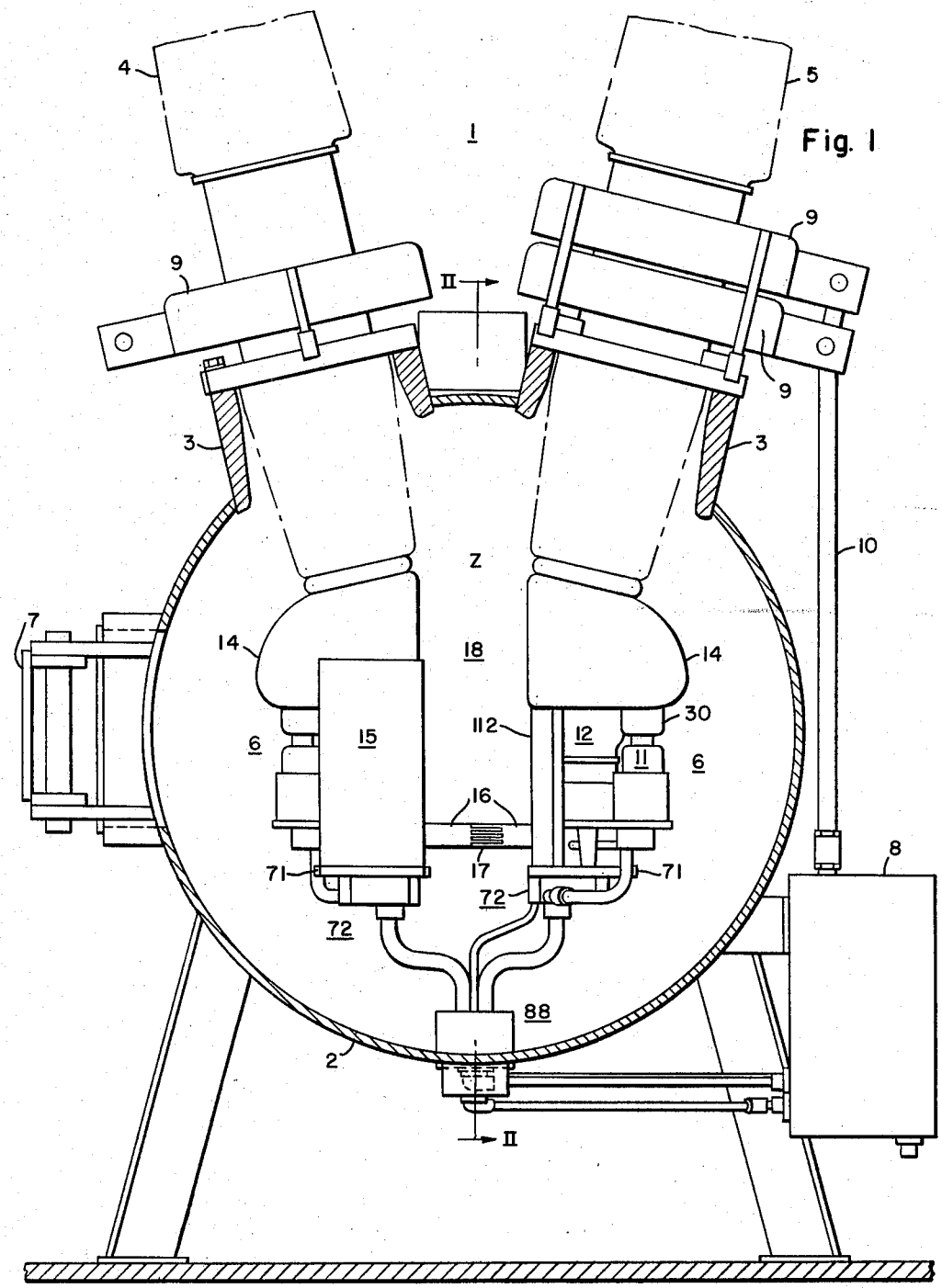
FIGURE 1 is a vertical sectional view taken substantially along the line I—I of the interrupter illustrated in FIG. 2 and embodying features of the present invention, with the circuit interrupter shown in the closed position.
Figure 2:
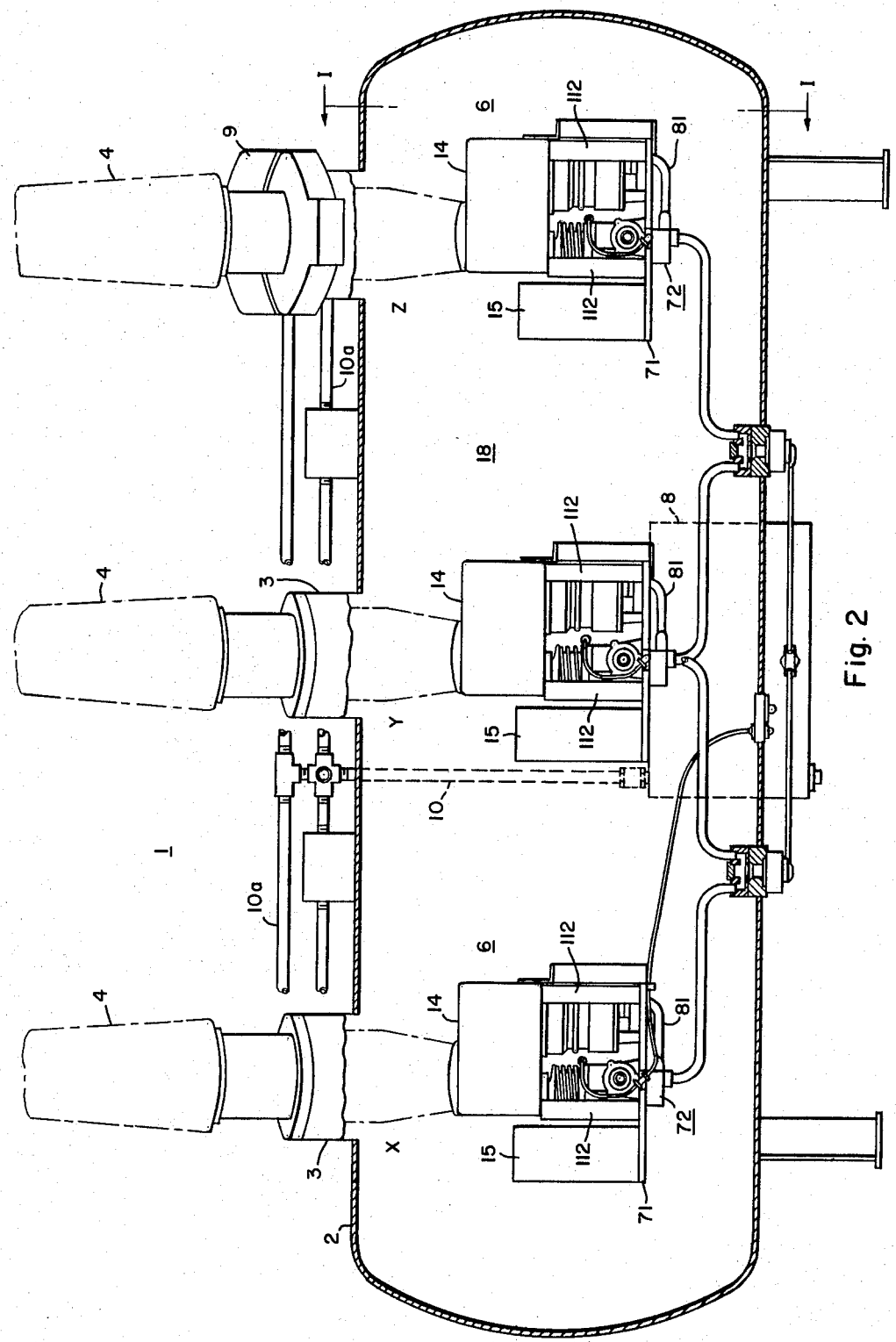
FIG. 2 is a longitudinal vertical sectional view taken through the improved circuit-interrupting structure of FIG. 1, the section being taken generally along the line II—II of FIG. 1.
Figure 17:
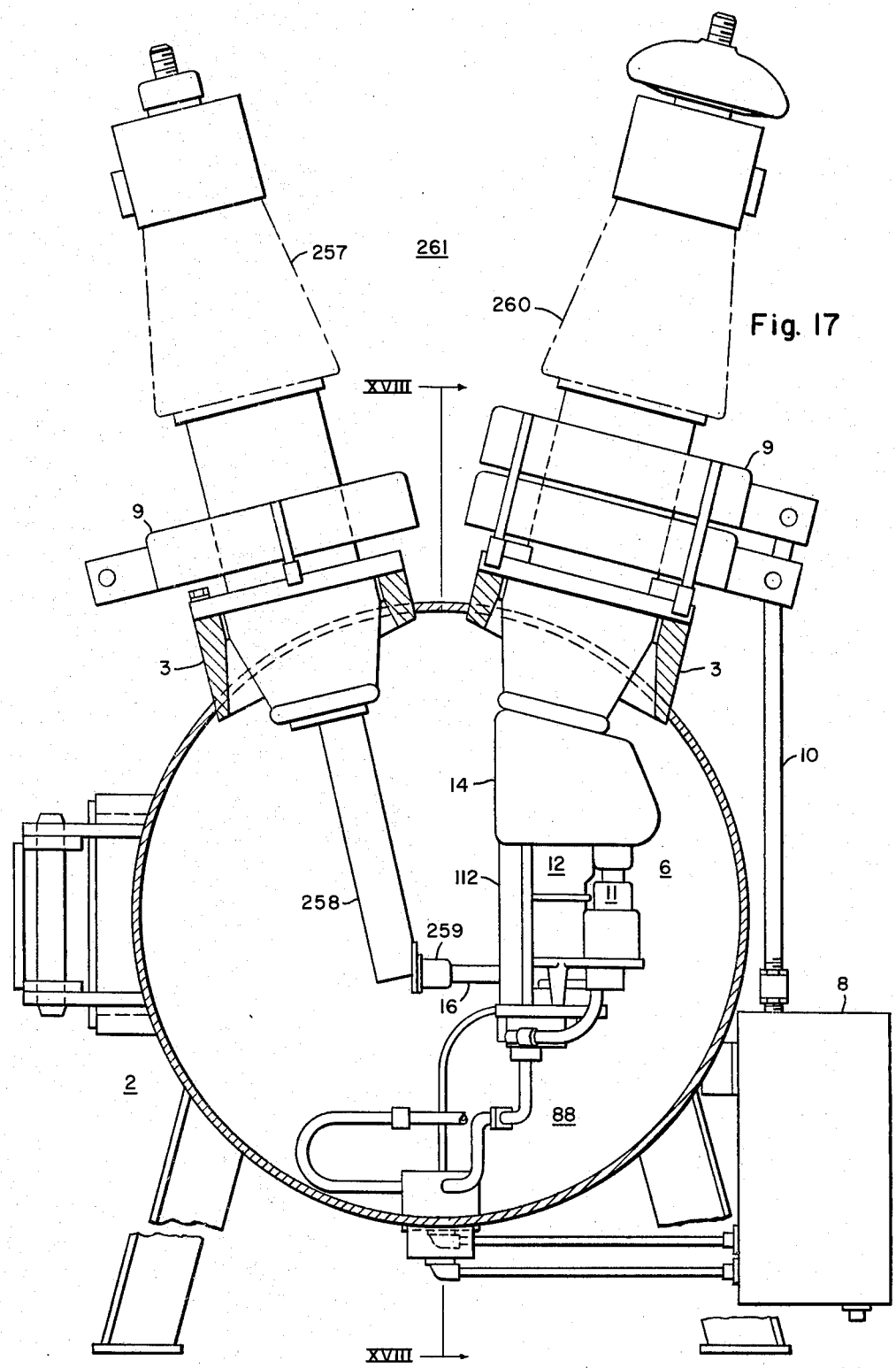
Figure 18:
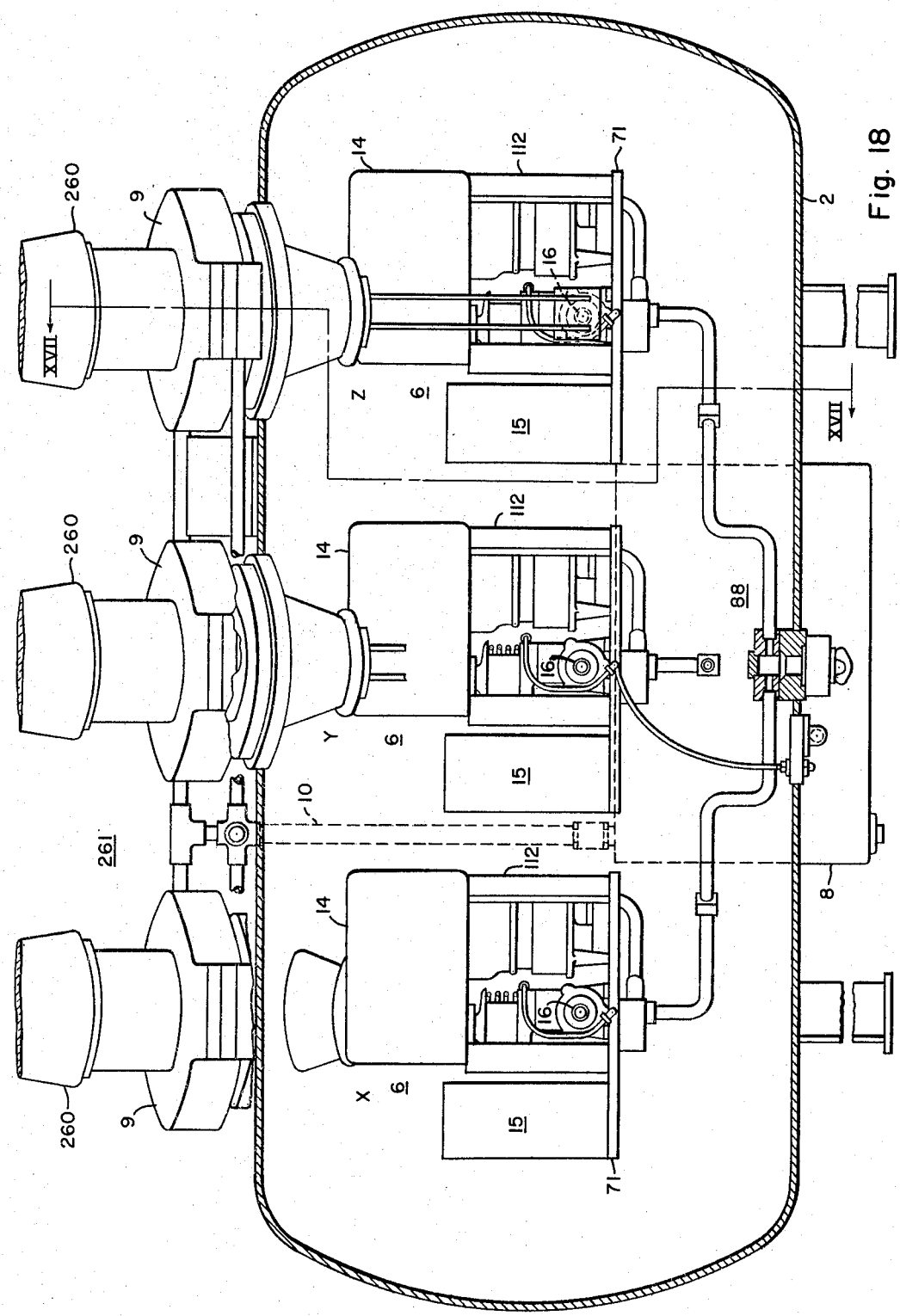
Figure 19:
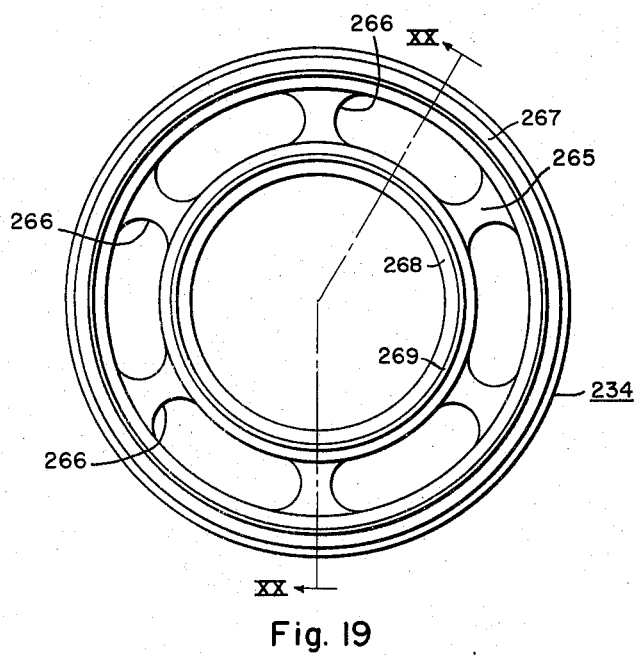
Figure 20:
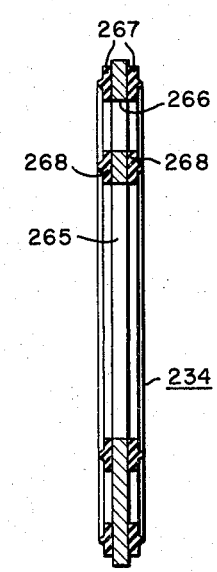
Figure 21:
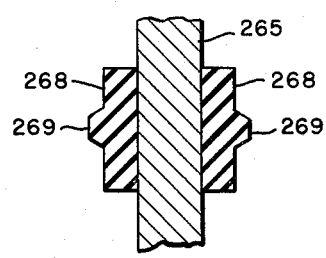

FIG. 17 is a vertical sectional view taken along the line XVII—XVII of the circuit interrupter of FIG. 18, the circuit interrupter being of reduced voltage, for instance 46 kv., as opposed to the 115 kv., for example, rating of the circuit-interrupting structure of FIGS. 1 and 2, the circuit interrupter being shown in the closed-circuit position;

FIG. 18 is a longitudinal sectional view of the lower-rated circuit interrupter of FIG. 17, taken substantially along the line XVIII—XVIII of FIG. 17, again the circuit interrupter being shown in the closed-circuit position;

FIG. 19 is an elevational view of a perforated gasket used in the invention;

FIG. 20 is a sectional view taken along the line XX—XX of FIG. 19; and,

FIG. 21 is a fragmentary enlarged view of the bead construction of the perforated gasket of FIGS. 19 and 20.

Referring to the drawings, and more particularly to FIGS. 1 and 2 thereof, the reference numeral 1 generally designates a compressed-gas circuit interrupter. In this particular instance, the circuit interrupter 1 includes three pole units X, Y and Z disposed within a single pressurized tank 2 controlling the three phases. The tank 2 contains gas under pressure, say 250 p.s.i. As shown, the tank 2 is preferably grounded for safety reasons. Extending downwardly through the upper portion of the tank 2 through supporting sleeves 3 are a plurality of pairs of terminal bushings 4, 5. The terminal bushings 4, 5 not only serve to carry current into the pressurized tank 2 to be interrupted therein by the arc-extinguishing assemblages 6, but also preferably the terminal studs extending axially through the terminal bushings 4, 5 are hollow, and thus serve to carry the exhaust arc gases out of the tank structure 2 following a circuit-interrupter opening operation. In this respect, the construction is somewhat similar to that set forth and claimed in United States patent application filed June 7, 1956, Serial No. 590,066, now U.S. Patent 2,965,-735, issued December 20, 1960 to Benjamin P. Baker, and assigned to the assignee of the instant application.

Extending laterally from one side of the tank 2 is an inspection door 7, and mounted upon the opposite side of the tank structure 2 is a control housing, or compartment 8. Current transformers 9 encircle the terminal bushings 4, 5 and have their secondary wiring extending through conduits 10, 10a into the control compartment 8.

Figure 3:
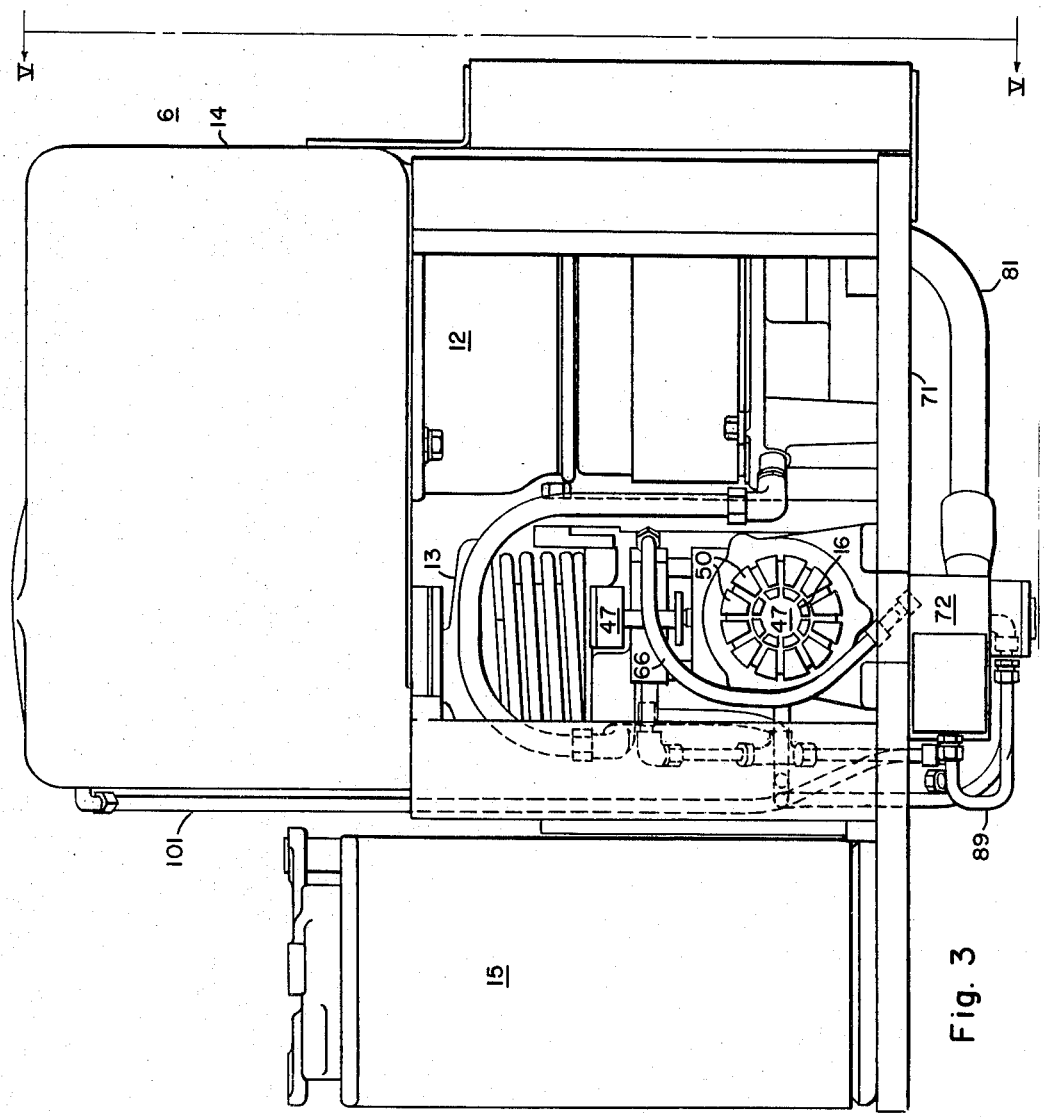
FIG. 3 is a side elevational view of one of the improved circuit-interrupting elements employed in the improved compressed-gas circuit interrupter of FIG. 1.

With reference to FIGS. 3 and 4, which respectively illustrate side elevational and top plan views of the arc-extinguishing assemblage 6, it will be noted that each arc-extinguishing assemblage 6 includes a separable pair of main contacts, generally designated by the reference numeral 11 in FIG. 5. In addition, the assemblage 6 contains a pair of main arcing contacts, generally designated by the reference numeral 12, and a shunting pair of separable resistance or impedance contacts, generally designated by the reference numeral 13. The arc-extinguishing assemblages 6 are supported by a metallic exhaust chamber 14, preferably of cast metal construction, which is fixedly secured to the lower extremity of each terminal bushing 4, 5. An upstanding impedance, or resistor 15 is disposed in series with the separable resistance contacts 13 and serves, with the resistance contacts 13, to facilitate the interruption of the main current through the main arcing contacts 12. As well known by those skilled in the art, upon the insertion of the impedance 15 into the circuit during a portion of the opening operation, the magnitude or amperage of the current is diminished, and also the power factor of the circuit is improved. The interruption of the resistance current by the separable resistance contacts 13 completely interrupts the passage of current flow through the interrupter 1, and at this time it is desirable to effect opening of a pair of serially-related isolating contacts 16, each of which is of the type set forth in FIGS. 6 and 7 of the drawings.

With reference to FIG. 1, it will be observed that the separable isolating contacts 16 engage in the closed-circuit position, as at the point 17, and retract backwardly, or rearwardly at the final end of the opening operation of the circuit interrupter 1. By providing separable isolating contacts 16, which maintain the circuit open in the open-circuit position, reclosure of the main contacts 11, main arcing contacts 12 and separable resistance contacts 13 may then be effected. Since the interior 18 of the tank 2 contains gas at a relatively high pressure, it will be obvious that the disconnecting gaps 17 are provided in a high-dielectric-strength atmosphere, and consequently only a minimum disconnecting-gap distance need be provided.

Generally, the circuit interrupter 1 functions during the opening operation to first effect separation of the main contacts 11, then subsequently the separation of the main arcing contacts 12, which is followed by separation of the resistance contacts 13. When this has been completed, the isolating contacts 16 are separated from each other, and, at a predetermined later time, the separable contacts 11, 12 and 13 are reclosed. As a result, in the fully open-circuit position of the circuit interrupter 1, the several separable contact structures are reclosed, and the circuit is maintained open by the separated disconnecting contacts 16.

To effect a closing operation of the circuit interrupter 1, suitable means are provided to effect re-engagement of the previously-separated disconnecting contacts 16. Since the other serially related contacts 11, 12, 13 have previously been reclosed at the end of the previous opening operation, the engagement of the disconnecting contacts 16 will thereby effect a resumption of the current passage through the interrupter 1.

Figure 8A:
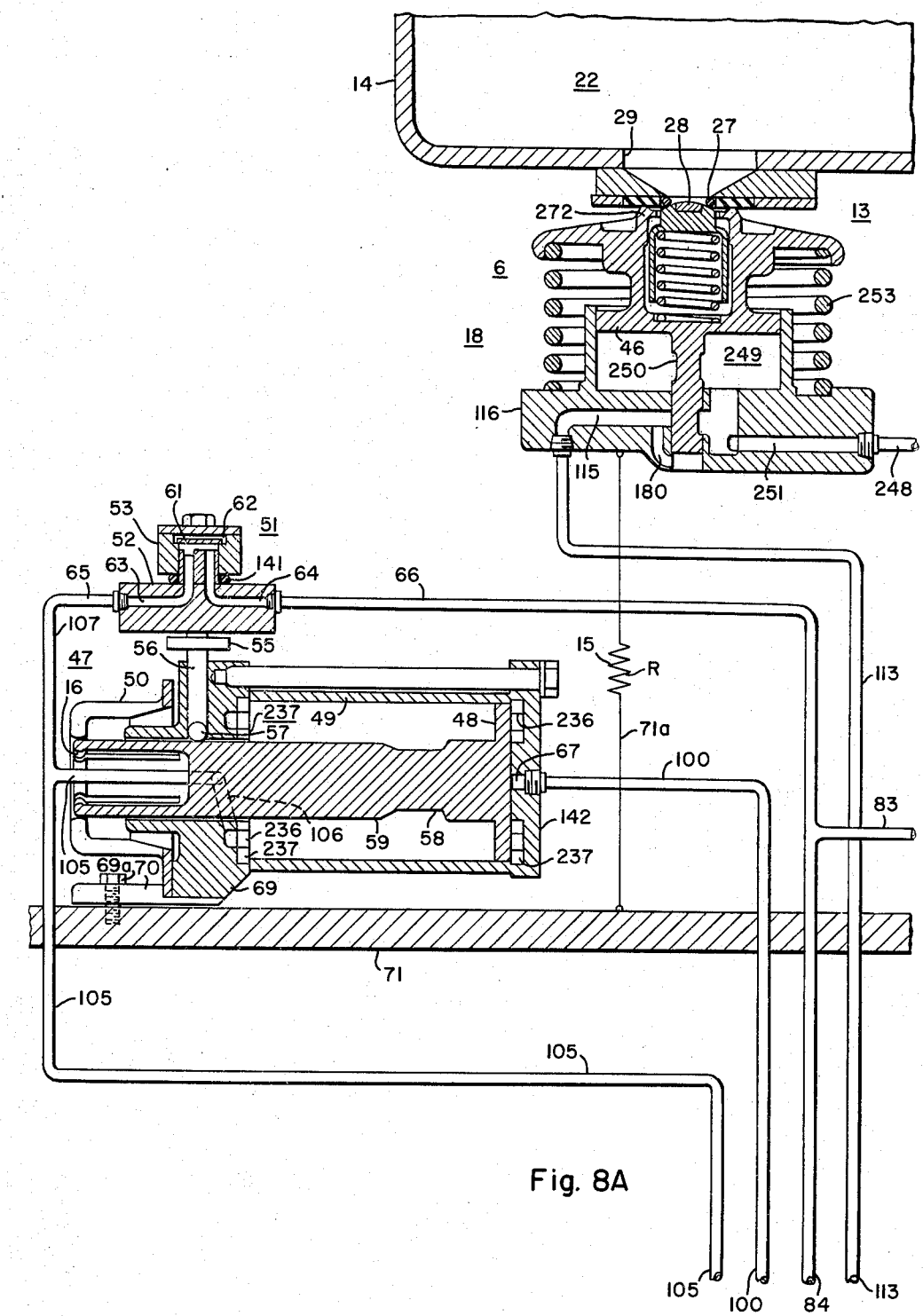
Figure 8B:
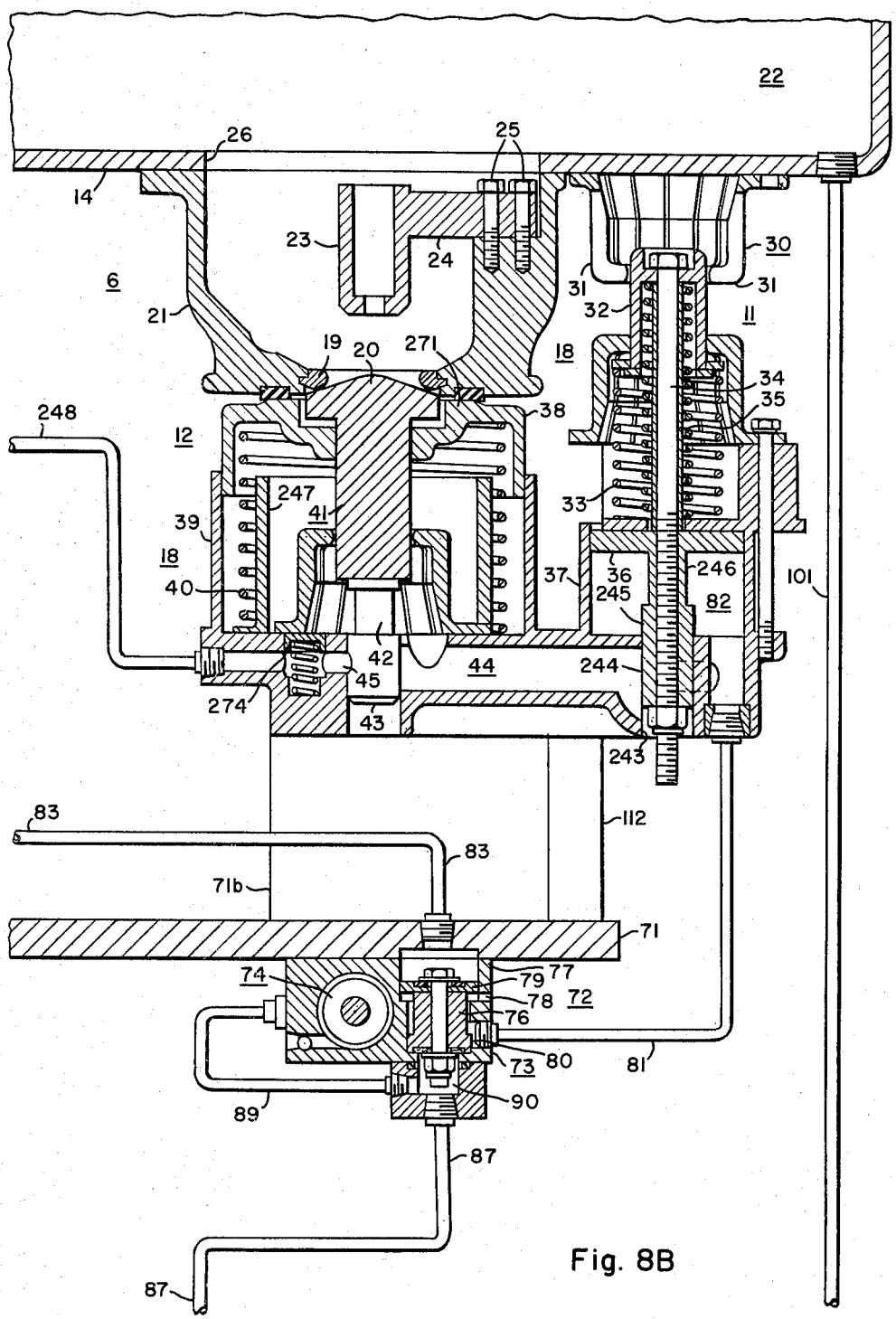

With reference to FIGS. 8A and 8B, it will be observed that the arc-extinguishing gases for interrupting current flow between the relatively stationary orifice contact 19 and the movable main arcing contact 20 of the main contacts 12 are exhausted upwardly through a cup-shaped contact support 21 and into the interior 22 of the exhaust housing 14. To facilitate the centering of the main current arc drawn through the orifice contact 19 and the consequent receiving of a radial inward blast of gas, preferably an arc-centering horn 23 is provided. As shown, the arc horn 23 is perforated, and is positioned by a supporting arm 24, which is bolted by bolts 25 to an upper shoulder portion of the contact support 21. An opening 26 registers with the opening through the contact support 21 and, as mentioned, the region 22 within the exhaust housing 14 communicates with the hollow terminal stub extending through the associated terminal bushing, so that eventually the gas blast exhausts to atmosphere externally of the tank structure 2.

Similarly, the relatively stationary orifice contact 27 and the relatively movable resistance contact 28 separate to draw a resistance current arc, which is subjected to a radial inward blast from the region 18 interiorly of tank 2, through the orifice opening and out through an aperture 29 to region 22 within exhaust chamber housing 14, whence the gas blast exhausts through the hollow terminal bushing to the atmosphere as before.

With reference to FIG. 8B, it will be noted that the shunting main current contacts 11 include a relatively stationary finger contact 30 comprising a plurality of radially inwardly extending fingers 31, which engage a movable main contact 32, the latter being biased upwardly toward the closed-circuit position by compression springs 33. To effect the opening of the main movable contact 32, a piston rod 34 and spacing sleeve 35 attach the movable main contact 32 to a piston 36 operated vertically within an operating cylinder 37. As more fully brought out hereinafter, dumping of the gas pressure below the piston 36 will effect downward opening movement of the piston 36 and the main movable contact 32 associated therewith. This will force the current passing through the main contacts 11 to flow by means of the main arcing contacts 12 and the resistance contacts 13, although the latter will carry a relatively small proportion of the curernt because of the presence of the series resistance 15.

The main movable arcing contact 20 is moved downwardly in an opening direction by a piston 38 movable within an operating cylinder 39, and spring-biased upwardly in a closing direction by a compression spring 40. The lower end of the piston rod 41 has a reduced spindle-valve portion 42 and a lower enlarged valve-spool portion 43. As a result, the valve portions 42, 43 form a sleeve valve, which prevents or permits communication between a passageway 44 and a passageway 45 leading to the region below the piston 46 of the impedance interrupting unit 13.

The disconnecting contact structure, generally designated by the reference numeral 47, will now be described. As pointed out hereinbefore, the disconnecting contact structure includes a relatively movable rod-shaped disconnecting contact 16, which is actuated by pressure differences across a piston 48, the latter being movable within an operating cylinder 49. Relatively stationary contact fingers 50 bear upon the sides of the movable disconnecting contacts 16 to transmit current therethrough from a cylinder head 69, the latter being electrically connected to the resistance section 15. More specifically, the cylinder head 69 is electrically and mechanically connected by the bolts 69a to conducting support plate 71 and thence by connection 71a to resistance 15. Also the plate 71 is connected by connection 71b (FIG. 8B) to the main movable contacts 11, 12.

One or more insulating support rods 112 (FIGS. 1 and 8B) support the plate 71 in a fixed position relative to upper exhaust housing 14. As shown in FIG. 5, the movable elements of the interrupting contacts 11, 12 and 13 are supported from lower conducting support plate 71.

In the closed circuit position as shown in FIG. 1, the current path through the interrupter extends through the hollow terminal studs enclosed by the terminal bushings 4, 5, and through closed contacts 11, 12 and 13 to the conducting support plates 71. The current path then extends through the interposed disconnecting contact structure 47 by way of support feet 70, bolts 69a (FIG. 8A) cylinder head portions 69 and fingers 50 to movable disconnecting contacts 16, which meet at point 17 in FIG. 1.

Associated with the disconnecting contact structure 47 is a sequencing valve, generally designated by the reference numeral 51. With reference to FIGS. 6 and 7, it will be noted that the sequencing valve 51 includes a relatively stationary part 52 and a relatively movable part 53. The relatively movable part 53 is actuated by a pair of operating rods 54 interconnected at their lower extremities by a yoke portion 55, the latter making abutting engagement with an actuating rod 56, the lower extremity of which rests upon a ball 57. The ball 57 is capable of being recessed in a cut-out portion 58 of the piston rod 59.

A spring 60 (FIG. 7) biases the movable part 53 of the sequencing valve 51 to a downward position, wherein the valve disc 61 floats in the region 62. The spring 60 also maintains the yoke 55 in abutting engagement with actuating rod 56. Connecting with the region 62 are a pair of passageways 63, 64, which respectively connect with pipes 65, 66, as more clearly shown in FIG. 8A of the drawings.

It will be noted that when the disconnecting contact 16 is in its open position, as illustrated in FIGS. 7 and 8A, the ball 57 forces the actuating rod 56 upwardly, and hence raises the loose valve disc 61 above the upper extremities of the passageways 63, 64. Also, it will be apparent that when the disconnecting contact 16 is in its leftward closed position, wherein the ball 57 seats within the recess 58, the actuating rod 56 will then be in its lower position, wherein the movable portion 53 of sequencing valve 51 will abut a ring gasket 141 and thereby permit the valve disc 61 to "float" over the passageways 63, 64 within the region 62.

As shown more clearly in FIG. 7, the operating cylinder 49 includes an end plate 142 having an inlet passage 67. Elongated bolts 68 rigidly interconnect the end plate 142 with the outer cap body, or head portion 69 having bracket feet 70 adapted to receive the mounting bolts 69a, so that the disconnecting contact structure 47 may be supported from the lower support plate 71 of the extinguishing assemblage 6, as indicated in FIG. 3 of the drawings.

With reference to FIG. 3 of the drawings, it will be observed that position below the supporting plate 71 and secured thereto is a pneumatic control-valve assembly or "brain," generally designated by the reference numeral 72, and having an internal construction more clearly shown in FIGS. 8B and 8D of the drawings. Generally, the pneumatic control-valve assembly, or "brain" 72 includes an interlocking inlet valve 73, a composite disconnecting-switch control-valve assembly 74 and an interlocking valve 75.

The interlocking inlet valve 73 includes a differential-area valve piston 76 operable within an operating cylinder 77 having an opening 78 therein to the interior 18 of tank 2. It will be noted that the annular upper area 79 of the differential piston 76 is larger than the lower annular area 80, the reason for which will be more apparent hereinafter.

A conduit 81 pneumatically interconnects the interlocking inlet valve 73 with the area 82 below the actuating piston 36 for the main movable contact 32, as shown in FIG. 8B. In addition, a pressure-sensing conduit 83 pneumatically interconnects the upper end of the interlocking inlet valve 73 with the pipe 66 (FIG. 8A) and with another pipe 84, which connects to the upper end of an operating cylinder 85 of a pneumatically-operated position-indicating device 131, within which moves a piston 86 for indicating the open and closed-circuit positions of the interrupter 1.

Figure 8C:
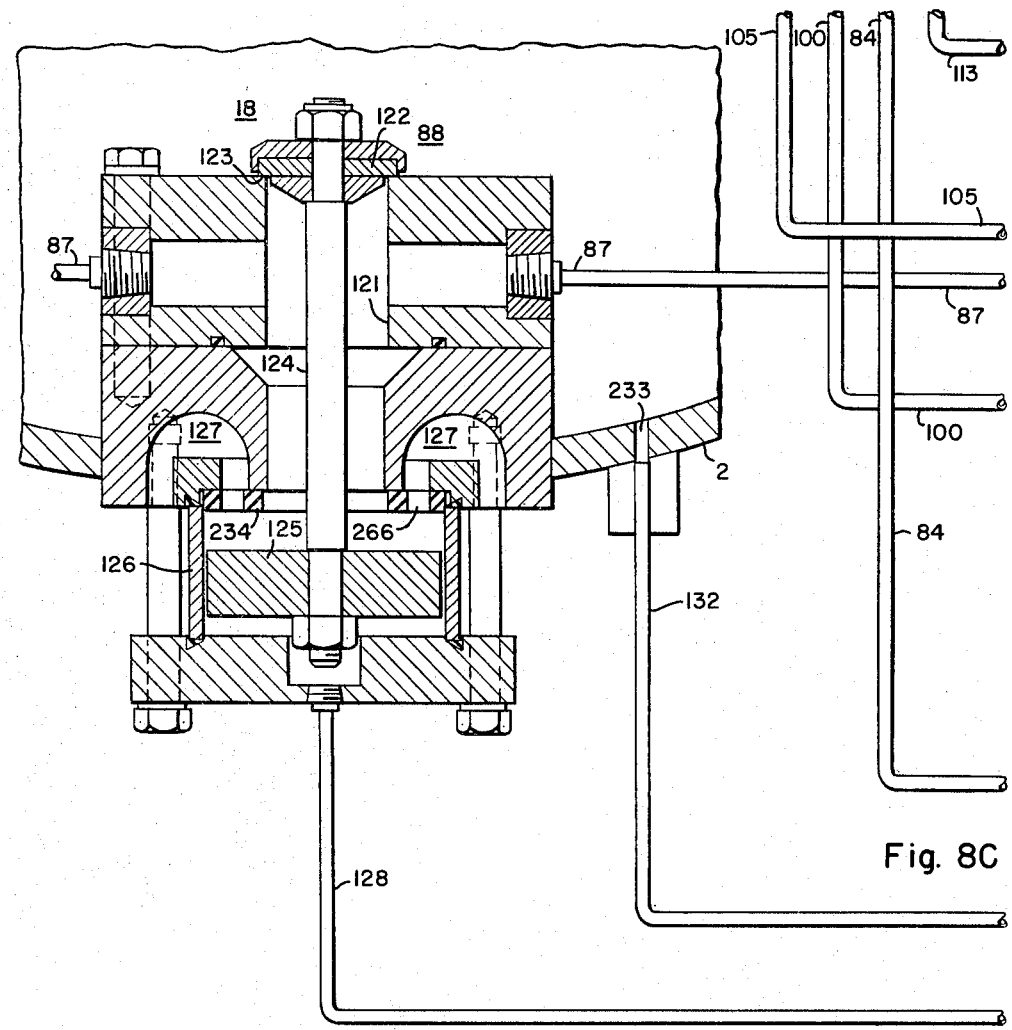

An inlet conduit 87 connects with a double-acting exhaust valve, generally designated by the reference numeral 88, and shown more clearly in FIG. 8C of the drawings. Another pipe 89 pneumatically connects the region 90 below the differential-area interlocking inlet valve 73 with the region 91 below a valve piston 92 spring-biased downwardly, as shown in FIG. 8D, by a compression spring 93. Disposed immediately above the valve piston 92 is the composite disconnecting-switch control-valve assembly 74 including two piston valves 94, 95 having their valve stems 96a in abutting engagement. The upper piston valve 95 is spring-biased downwardly to a closed position, as shown in FIG. 8D, by a compression spring 97, which is stronger than the compression spring 93. As a result, in the absence of pressure conditions, as illustrated in FIG. 8D, the composite disconecting-switch control-valve assembly 74 is in its lower position, as shown.

The region 98 above the valve piston 94 and within an enlarged portion 99 communicates by way of a pipe 100 with the inlet opening 67 (FIG. 8A) of the disconnecting contact structure 47. An exhaust pipe 101 connects with the region 22 interiorly of the exhaust chamber housing 14 and hence with the atmosphere through the hollow terminal bushing 4 or 5.

The region 104 above the upper valve piston 95 pneumatically connects, by means of a pipe 105, with a side inlet port 106 of the head portion 69 of the disconnecting contact structure 47, as shown in FIGS. 6 and 7 of the drawings. In addition, the pipe 65 interconnects conduit 105 with the inlet passageway 63 of the sequencing valve 51.

With reference to FIG. 8D of the drawings, it will be noted that a passageway 108, provided in the valve body 109 of the control valve assembly 72, interconnects the region 104 with an additional region 110 above the interlocking valve piston 75. A compression spring 111 biases the interlocking valve 75 upwardly toward its closed position, as shown in FIG. 8D of the drawings. A pipe 113 pneumatically interconnects the region 114 below the interlocking valve 75 with a passageway 115 provided in the operating cylinder head 116 of the impedance interrupting unit 13. It will be noted that an opening 117, provided in the valve casing 109 (FIG. 8D) applies high-pressure tank pressure from tank space 18 to a portion of the interlocking valve 75.

With reference to FIG. 8D, it will be noted that a bypassing channel 118, having a side-port opening 119 interconnects with inlet opening 120 of valve casing 109, the purpose of which will appear hereinafter.

With reference to FIG. 8C of the drawings, it will be observed that the double-acting exhaust valve 88 includes a manifold portion 121 which connects with the inlet pipe 87 of arc-extinguishing assemblage 6 of FIGS. 8A and 8B, as well as with the inlet conduit 87 of an adjacent arc-extinguishing assemblage 6 (not shown). Simultaneous operation of the extinguishing assemblages 6 is thereby obtained. An inlet valve 122 controls an opening 123 leading to the interior 18 of the tank structure 2. The inlet valve 122 has a valve stem 124, which is secured to an operating piston 125 movable within an operating cylinder 126. Exhaust passages 127 connect the upper side of the piston 125 to atmosphere, as shown by the illustrated position of the valve 122 in FIG. 8C. To effect upward closing motion of the valve stem 124 and consequent opening of the inlet opening 123, high-pressure gas may be supplied to the lower surface of the piston 125 by means of a pipe 128, which connects to the outlet side of an electrically-operated main control valve, generally designated by the reference numeral 129, and shown in its entirety in FIG. 8D of the drawings. A branch connection 130 interconnects with pipe 128 and leads to the lower end of the operating cylinder 85 of the auxiliary-switch motor or position-indicating device 131.

A feed pipe 132 is provided, as shown in FIG. 8C, to supply high-pressure gas into the tank 2. With reference to FIG. 8D of the drawings, it will be noted that the feed pipe 132 connects, by way of a branch pipe 133 with a drain valve 134. The drain valve 134 has a pipe connection 135 out of the control housing 8, as shown.

With reference to FIG. 8D of the drawings, it will be noted that an inlet valve 136, provided within the control housing 8, feeds high-pressure gas from an external high-pressure source, not shown, through a check valve 137 and through a pipe 138 to the inlet side of the main control valve 129. Also it will be noted that a branch pipe 139 interconnects the pressure-sensing pipe connection 84 with the "index adapter" valve assembly 140 of the main control valve 129.

*Control valve assembly 129*

The construction and operation of the electrically-operated main control-valve assembly 129 will now be described. Essentially, the main control-valve 129 comprises three sections. The first section is the electrically-actuated pilot valve, generally designated by the reference numeral 143 in FIG. 14. The pilot valve 143 functions to admit pressure to, or to exhaust pressure from, the index-adapter valve assembly 140, which constitutes the second section of the main control-valve 129. The third section of the main control valve 129 comprises a main valve, generally designated by the reference numeral 144, and shown more clearly in FIG. 14.

Figure 14:
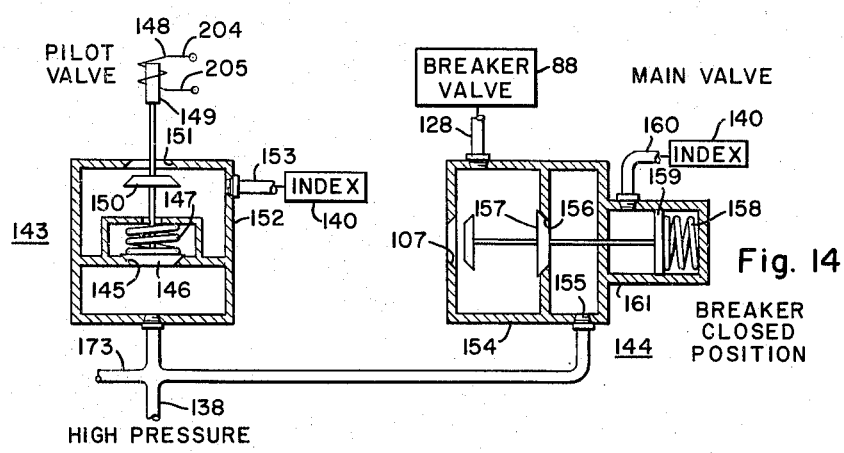
FIG. 14 is a fragmentary diagrammatic view illustrating the general arrangement of the pilot and main valves of the control-valve assembly, which are taken in conjunction with the index-adapter valve assembly of FIGS. 9–13.

With reference to FIG. 14, it will be observed that the pilot valve 143 is essentially a three-way acting valve, and functions to admit high-pressure gas through an opening 145 controlled by a valve 146 and biased by a spring 147 to the closed position. When the valve 146 is opened, in opposition to the spring 147 by energizing the coil 148 to attract the armature 149, a second valve 150 closes off an exhaust port 151 of the valve casing 152. This permits high-pressure gas to pass from the high-pressure source pipe 138 through the valve 143 and out an outlet pipe 153.

When the operating coil 148 is deenergized, the spring 147 closes the valve 146 over the opening 145 thereby shutting off the flow of high-pressure gas out through the outlet opening 153, and the opening of the exhaust valve 150 serves to dump the pressure through the outlet pipe 153.

The outlet pipe 153, leading away from the pilot-valve assembly 143, functions to operate the index-adapter valve assembly 140, more fully described hereinafter.

With further reference to FIG. 14, it will be noted that the main operating valve, generally designated by the reference numeral 144, comprises a valve casing 154 having a high-pressure inlet opening 155. As shown, the high-pressure inlet opening 155 preferably connects with the high-pressure source pipe 138. Disposed interiorly within the valve casing 154 is a valve assembly, which functions as a three-way operating valve to admit high pressure gas through an opening 156 upon opening of a valve 157, the latter being biased to the open position by a spring 158 biasing a valve piston 159. As shown, when no pressure acts upon the valve piston 159, the spring 158 holds the valve 157 to the open position, as shown, and permits high-pressure gas to pass through the opening 156 and through the outlet pipe 128. This leads directly to the double-acting exhaust valve 88, as previously described.

An inlet opening 160 leading into the operating cylinder 161 from the index adapter 140 functions to effect either opening of the valve 144 to permit the passage therethrough of high-pressure gas, or closure of the valve 157 and consequent exhausting of gas through the pipe 128 through exhaust opening 107.

With reference to FIGS. 9–13, it will be noted that the index-adapter valve assembly 140 includes a movable control spool 162 and a movable actuator spool 163. As shown, the movable control spool 162, disposed on the left, as viewed in FIG. 9, carries three seals 164–166. The lower seal 164 serves as a piston seal for the piston portion 167 of the control spool 162. The middle seal 165 forms a straight-way valve, and the upper seal 166 is also a piston seal.

The movable actuator spool 163, disposed on the right, as viewed in FIG. 9, carries four seals 168–171, the lower two seals forming a three-way valve, and the upper two seals serving as piston seals. The gasket 172, shown in FIG. 11, is, for example, 1/16 inch thick, and is placed between the air index adapter 140 and the pilot section 143. Point 173 is the point of application of pilot outlet pressure, which is obtained from the outlet 153 (FIG. 14) of the pilot value section 143, which is contiguous to the gasket 172. Through the gasket slot 174 the pilot pressure is transmitted to the lower portion of the control spool assembly, as indicated schematically in FIG. 9 by the pilot-outlet connection 153.

Constant pilot supply pressure is maintained at portion 175 (FIG. 11) of gasket slot 176. Thus, the connection 173 of FIG. 14 may be connected to portion 175 of FIG. 11. By reason of the gasket slot 176, this high pressure is transmitted to the chamber 177 to supply the actuator spool functions. A vent 178 is provided, as well as the connection 160 leading to the operating cylinder 161 for actuating the main operating valve 157 of main valve 144 of FIG. 14.

*Sequence of operation of air-index adapter section 140*

FIG. 9—Pilot chamber "A" exhausted:
(1) Control spool 162 is spring-returned down by spring 179.
(2) After actuator spool 163 is locked down by downward movement of the control spool 162, chamber "F" is exhausted through "E," "D," and "H." Chamber "G" is exhausted by the pressure sensing line 139.
(3) Main valve operating piston chamber 161 remains exhausted.
(4) These positions are in accordance with the breaker-closed position.

FIG. 10—Pilot chamber "A" pressurized:
(1) Control spool 162 is moved up.
(2) Straight-way valve between chambers "E" and "F" is closed, after which actuator spool 163 is unlocked.
(3) Inlet pressure from constant pilot supply at 175, acting in chamber "C," "acts on unequal areas of actuator spool 163" in chamber "C" and actuator spool 163 is moved up, closing exhaust port 178 and opening chambers "D" and "E" to pressure.
(4) Main valve operating piston chamber 161 is pressurized.
(5) This corresponds to the breaker opening position.

FIG. 13—Pilot chamber "A" exhausted:
(1) Control spool 162 is spring returned down.
(2) After actuator spool 163 is locked up by the downward movement of the control spool 162, the straight-way valve between chambers "E" and "F" is opened.
(3) Chamber "F" is pressurized.
(4) Chamber "G" is pressurized from the pressure sensing line 139.
(5) Main valve operating piston chamber 161 remains pressurized.
(6) The foregoing positions correspond with the breaker open position.

FIG. 12—Pilot chamber "A" pressurized:
(1) Control spool 162 is moved up.
(2) Straight-way valve between "E" and "F" is closed, trapping pressure in chamber "F." Chamber "G" is pressurized from the pressure sensing line 139.
(3) Actuator spool 163 is unlocked.
(4) Trapped pressure moves actuator spool 163 down, closing inlet port "C" and opening chambers "D" and "E" to exhaust.
(5) Main valve operating piston chamber 161 is exhausted.
(6) The foregoing position of the parts corresponds to the breaker-closing position.

Pilot chamber "A" exhausted:
(1) Cycle is repeated, see FIG. 9 and sequence above.

*Electrical control*

Figure 16:
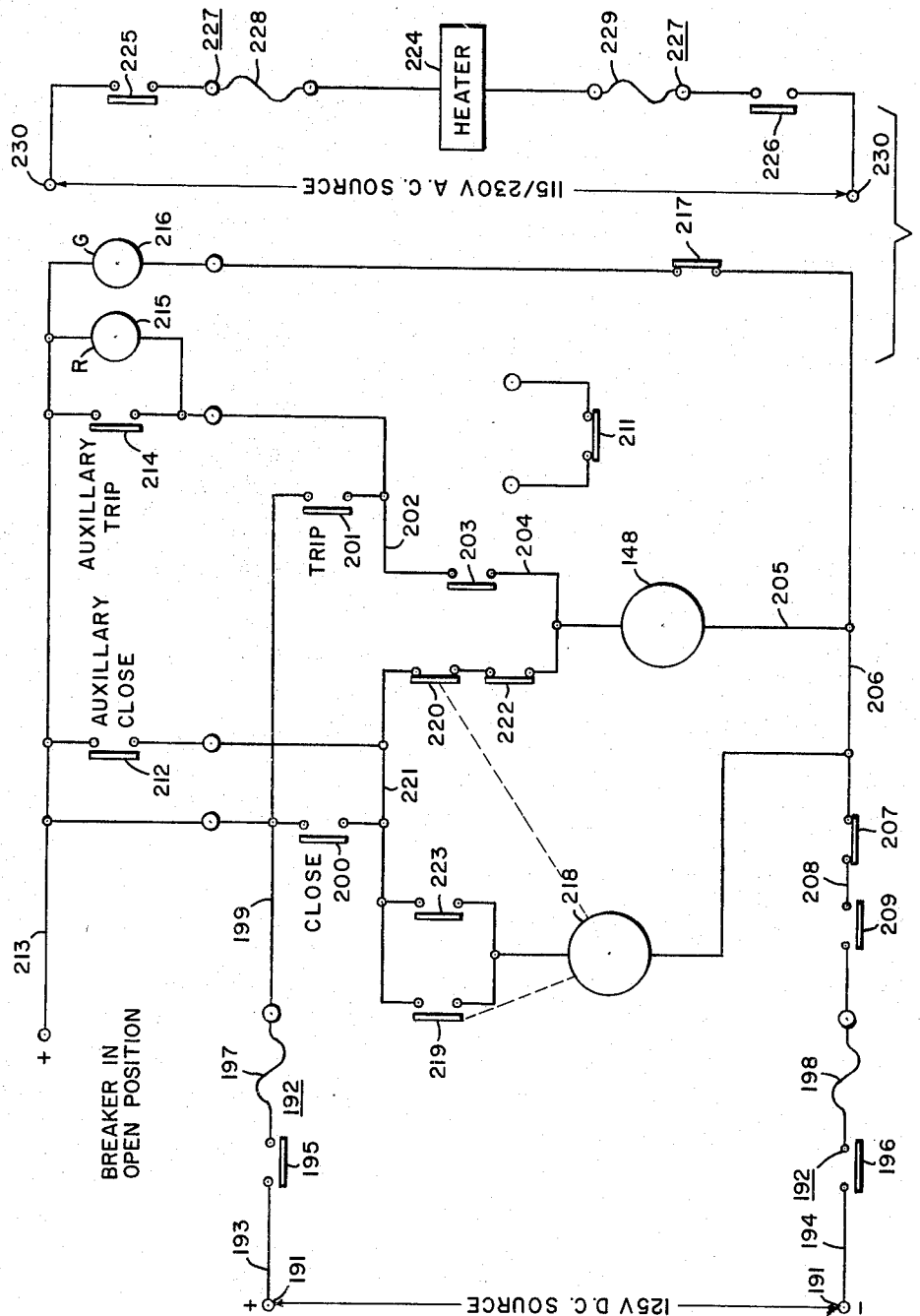
FIG. 16 is a diagrammatic view illustrating the electrical control for the circuit-interrupting structure of the present invention.

FIG. 16 shows the electrical control for the circuit interrupter 1 of the present invention. With reference to FIG. 16, it will be noted that a source of D.C. supply 191 is provided. In this particular instance, the D.C. voltage is indicated, for example, as 125 volts D.C. A two-pole breaker 192 is connected in series with the source lines 193, 194. The contacts 195, 196 are engaged by manually closing the two-pole breaker 192. This breaker 192 has, of course, thermal tripping means 197, 198 for each of the sets of contacts 195, 196, as shown. The line 199 is connected to a closing push-button switch 200 and to a tripping switch 201, which switches may be of the push-button type. A connecting line 202 leads through an auxiliary switch contact 203, which is open in the open-circuit position of the breaker, and which is closed in the closed circuit position of the breaker, as shown in FIG. 8D. With reference to FIG. 8D, it will be noted that the auxiliary switch 203 is operated by motion of the piston 86.

Returning to FIG. 16, it will be observed that a line 204 connects the auxiliary switch 203 to the operating coil 148. Note FIG. 14 in this connection. A line 205 connects the other side of the operating coil 148 to a line 206 and through a key interlock 207. An additional line 208 causes the circuit to pass through the pressure-responsive contacts 209 of a low-pressure cut-out switch 210 (FIG. 8D). The low-pressure cut-out switch 210 may have additional normally closed contacts 211 (FIG. 16), which may be connected into an alarm circuit, if desired.

An auxiliary closing push-button 212 may be employed connected to an auxiliary positive line 213, as shown. In addition, an auxiliary tripping push-button 214 may be positioned in shunt with the tripping push-button 201. A red indicating light 215 may be utilized, indicating the closed position of the breaker. A green indicating light 216 may be connected through a set of auxiliary contacts 217 to indicate the open-circuit position of the interrupter 1.

To prevent "pumping," an anti-pump relay having an operating coil 218 with normally-open contacts 219 and normally-closed contacts 220 may be employed. A line 221 connects the closing push-button 200 to the operating coil 148 through the normally closed contacts 220 of the anti-pump relay 218 and through a pair of normally closed auxiliary contacts 222. A normally opened set of auxiliary contacts 223 are provided in shunt with the normally opened contacts 219 of the anti-pumping relay 218.

Since the circuit breaker 1 is of the outdoor type, and may be operated during inclement weather conditions, such as freezing weather, a heater 224 may be provided to maintain the ambient temperature around the valves 146, 157, etc. at a proper temperature. The heater 224, as shown in FIG. 16, is connected through the contacts 225, 226 of a two-pole manually operated breaker 227 which has thermal protective elements 228, 229 protecting the respective contacts 225, 226. Preferably, a separate A.C. source of supply 230 is provided.

When it is desired to operate the circuit interrupter 1, the manually operated two-pole breakers 192, 227 are closed. A suitable source of relatively high pressure gas, say 230 p.s.i., is provided and is connected to the inlet high pressure pipe line 231 of FIG. 8D. Upon opening the manually operated valve 136 the pressure will build up through the check valve 137 and into the high-pressure pipe line 138. This pressure will act upon the low-pressure cut-out switch 210 and will cause its contacts 209 (FIG. 16) to close when the requisite operating gas pressure is built up.

The closing of the pressure contacts 209 will complete the circuit through the key interlock switch 207, and will enable the operating coil 148 to become energized by closing either the closing push-button 200 or the auxiliary closing push-button 212. At this time, of course, the breaker is in the open-circuit position, so that the auxiliary contacts 222 and 217 are closed. Closing of the closing switch 200 will energize the control coil 148 through the normally-closed contacts 220 of the antipump relay 218. The coil 148 will actuate the pilot valve 143, in the manner described above in connection with FIG. 14. For the present purpose it is to be noted that when the circuit breaker 1 closes, in response to closing of the closing button 200, the auxiliary contacts 223 will close and pick up the anti-pump relay 218. This anti-pump relay 218 will be sealed in by the closing of its own normally-open contacts 219. The closing of the anti-pump relay 218 will also open up the contacts 220 and thereby open up the circuit 221 to the operating coil 148 as long as the closing button 200 is maintained manually closed. If there should be a short on the connected line to the breaker, the current transformers 3 will pick up this condition and will cause closing of the tripping button 201, which would tend to set up a tripping operation through the control coil 148. To prevent repeated opening and closing of the circuit interrupter 1, or "pumping action," the closing circuit 221 is deliberately open-circuited by the normally closed contacts 220 of the anti-pumping relay 218.

To effect a tripping operation of the interrupter the tripping push-button 201 is closed, or the current transformer 3 may effect the closing of the auxiliary trip 214. This will energize the control coil 148 through the auxiliary contacts 203, which, when the breaker is closed, will be in their closed position, ready for the make-up of the energizing circuit 202 through the control coil 148. The opening of the breaker will, of course, deenergize the control coil 148 by opening of the auxiliary contacts 203.

*Closing operation*

Assuming no air pressure in the reservoir 2 the air inlet valve 136 (FIG. 8D) is opened to admit air to the reservoir tank 2. Air, under pressure, flows through the check valve 137, pipe line 132 and into the air inlet opening 233 of tank 2, as shown in FIG. 8C. If the main operating control valve 129 (FIG. 8D) is in a position to close the breaker, i.e., valve 157 (FIG. 14) being opened for straight-through flow of high-pressure gas, then pressure is admitted to the exhaust valve piston 125 (FIG. 8C). This moves the valve piston 125 upwardly to cause the piston 125 to seat upon the gasket 234 and seal off the exhaust passages 127.

FIGS. 19–21 show more clearly the construction of the gasket 234. It comprises a perforated ring 265 having oval-shaped openings 266, as shown in FIG. 19. A pair of concentric rubber gaskets 267, 268 are cemented to each side of the ring 265, as shown in FIG. 20. Each gasket 267, 268 has a rubber bead 269 integrally formed therewith as shown in the enlarged view of FIG. 21. Thus, the piston 125, in its upper position, will seal against the beads 269 and so prevent exhaust to atmosphere.

The foregoing motion of valve piston 125 will unseat the double-acting exhaust valve 122, and will cause compressed air to flow from the tank 2 through the annular opening 123 and through the pipe lines 87 to the several interrupting assemblies 6. Compressed air will flow through the conduit 87 and into the control valve assembly 72 (FIG. 8B) to apply pressure to the lower seat side of piston 76. Simultaneously, pressure is applied through piping 89 (FIG. 8B) to valve piston 92 (FIG. 8D), previously biased to its downward seat by compression spring 93. This will create a pressure difference across the two valve pistons 92, 94 since the down stream side of valve piston 94 is connected to the exhaust chamber 14 by exhaust tube 101.

The two valve pistons 92, 94 move upwardly to drive the valve piston 95 upwardly from its lower seated position in opposition to the relatively strong compression spring 97. Coincident with this motion, valve piston 92 reaches the end of its stroke, abutting shoulder 235, but compressed gas continues to drive valve piston 94 upwardly to its upward seated position by the air pressure delivered through the bypassing channel 118 (FIG. 8D).

This opens a port to the rear of the isolator chamber 49 (FIG. 8A) through the tubing 100 for pressure to drive the isolator piston 48 to its leftward closed position. More specifically, the high-pressure gas passes through the tube 89, bypassing channel 118, region 98, opening 120, conduit 100, inlet opening 67 into operating cylinder 49 to exert pressure on the rear side of isolator piston 48.

Any air pressure on the opposite side of the isolator piston 48 is exhausted through the perforations 236 of gasket 237 (similar to gasket 234 of FIG. 19), through opening 106, pipe 105, region 104 below piston valve 95 (FIG. 8D) (the latter being in its upper position), into exhaust chamber 238, which is maintained at atmospheric pressure by way of exhaust tube 101 leading to exhaust chamber 14.

It should be noticed that atmospheric pressure now has been applied through the ports of the sequencing valve 51 (FIG. 8A), which is in its opened, or "through-air" flow position. This position is provided, initially, by ball 57 and pin 56 through the position of the isolator piston rod 59. After motion of the piston rod 59, the ball 57 falls into the recess 58 provided on the rod 59, thereby permitting the valve disc 61 to "float" upon its seat. Thus, any air not exhausted through the sequencing valve 51, when the ball 57 is recessed, continues to exhaust through tubing 66 and 83 (FIGS. 8A and 8B) to maintain atmospheric pressure upon valve piston 76 (FIG. 8B). This causes piston 76 to move upwardly and open the connection between conduit 87 and 81, the latter leading to the external main contacts 11. Valve piston 76 is now in its proper position for opening the circuit interrupter 1.

Isolating piston 48 is held in its closed-circuit breaker position by atmospheric pressure communicating through the annular ports 236 of gasket 237, passageway 106, lines 105 to exhaust region 238. Tank pressure exists upon the other side of the isolating piston 48, that is, on the right thereof. Gasket 237 is made with concentric seals 239, 240, in a manner similar to that shown in FIGS. 19–21 of the drawings.

It will be noted that upon loss of tank air pressure, there is no driving force exerted upon the isolating piston 48, and it will not move due to magnetic forces, since it is oriented in the manner shown in FIG. 1 of the drawings. Magnetic forces are applied perpendicularly to the direction of piston-rod motion; hence, it will not move unless application of pressure across the isolator piston 48 is reversed.

It should be noted that when no air pressure exists within the tank 2, or in other words there has been a complete loss of tank pressure, compression springs 93, 97 and 111 bias their respective valve pistons so as to prevent loss of tank air through the connection to the exhaust chamber 238 upon a subsequent refilling of the tank 2. Thus, if the circuit interrupter 1 had been closed, when tank pressure was lost, re-application of pressure through line 89 will cause valve piston 92 to move upwardly, since its area is larger than that of valve piston 95. It will consequently unseat valve piston 95 to exhaust the lefthand, or opening side of the isolator piston 48. Compression spring 111 and tank pressure exerted through pipe 113 prevents the other valve piston 75 from moving down and communicating tank pressure through opening 117 to the atmospheric exhaust 238. Pressure communicated to the closing side of the isolator piston 48 through inlet opening 67 will be held by gasket seal 237.

If the circuit interrupter 1 had previously been opened before loss of pressure, re-application of pressure will seal to the atmosphere, by the seal of piston valve 95, biased to the closed position by compression spring 97. In both cases, leakage around the isolator piston 48 is prevented by the gasket seals 237 at either end of the operating cylinder 49.

It should be noted that compression spring 97 is stronger than compression spring 93 so as to obtain the valve piston position shown in FIG. 8D for the no-pressure condition existing within the breaker tank 2.

From the foregoing, it will be apparent that the circuit interrupter 1 is closed by closing the isolating or disconnecting contacts 16. Pressure then exists upon the bottom, or driving side of the isolator piston 48, and atmospheric pressure exists upon the other, or left side of isolator piston 48. Pressure is continuously maintained upon the bottom of valve piston 125 (FIG. 8C) and the latter seals out atmosphere by reason of the gasket seal 234 (FIG. 19). Atmosphere is communicated through the sequencing valve 51 (FIG. 8A) and pipe 83 to the top of valve piston 76 (FIG. 8B), which is held in its upward, and seated position by pressure upon the upper annular area 79. This means that dropping pressure within conduit 87 will not cause motion of the piston assembly 76. Since tank pressure surrounds the interrupting assembly 6, the interrupting elements are pressurized and set for a breaker opening impulse.

Opening operation

To open the circuit interrupter 1, the control coil 148 is again energized. This will change the operating valve 129 from the straight-through position to the exhaust position. By such action the pressure will be reduced under double-acting valve piston 125 (FIG. 8C). The valve 122 will be forced downwardly by the high pressure gas existing within tank 2. This will exhaust the volume under valve 122 through the exhaust port 127 communicating through apertures 266 in gasket seal 234. Through the connecting insulating tubing 87, atmospheric pressure is communicated to the external main contact 11, the valve piston 76 being at this time in its upward raised position, as previously described.

With reference to FIG. 8B of the drawings, it will be apparent that dumping the pressure within region 82 below the contact piston 36 will permit the high-pressure gas existing within region 18 interiorly of tank 2 to force contact piston 36 downwardly. This downward movement of contact piston 36 will block off the inlet opening 243 by the enlarged portion 244 of piston rod 245. This will result in atmospheric pressure being transmitted by the reduced valve portion 246 to the region 44 below the contact piston 38 of the main arcing contacts 12. From the foregoing it will be apparent that essentially the piston rod 245 functions as a slide valve.

The current passing through the interrupter will, by opening of the main contacts 11, be forced to traverse the main arcing contacts 19, 20, and the resistance contacts 13. The transmission of atmospheric pressure along passageway 44 and below the contact piston 38 will cause the latter to move downwardly against the biasing action exerted by spring 40. Magnetic tubing 247, such as a steel tube, acts not only as a stop for downward movement of the main arcing contact piston 38, but also as an arc-centering magnetic conductor. This centers the arc, not shown, drawn between contacts 19 and 20, so that the latter has its upper terminal end carried to the arc horn 23. The main current arc will then extend substantially centrally through the orifice opening 19 and will be subjected to an intensive upward outward flowing radial gas blast into the exhaust chamber 14. Arc interruption will then rapidly occur.

The interruption of the main current arc is, of course, assisted by the use of the parallel resistor 15 (FIG. 8A). Downward motion of the valve-spool portion 43 will permit communication of atmospheric pressure around reduced valve portion 42, and through passageway 45 through line 248 to the region 249 below resistor contact piston 46. This will cause opening movement of the movable resistance contact 28 from the relatively stationary resistance contact 27. The opening of the resistance contacts 13 is so timed that it occurs subsequent to the interruption of the main current arc between main arcing contacts 19, 20. Downward movement of the resistance contact piston 46 will, in turn, cause downward motion of a sleeve-valve portion 250 to thereby communicate atmospheric pressure from passageway 251 to passageway 115 and thus by virtue of tubing 113 to the control valve assembly 72.

Thus, the region 114 on the underside of valve piston 75 is subjected to atmospheric pressure being transmitted by way of tubing 113. The upper side of the valve piston 75 is exposed to tank pressure through the high-pressure opening 117, and consequently the valve piston 75 will be moved downwardly from its upper seated position to admit tank pressure through the opening 117 and through the passageway 108 to the upper rear side of valve piston 95. This action is assisted by the compression spring 97.

The combination of tank pressure within region 104, coupled with the spring pressure exerted by compression spring 97 will rapidly move the piston assembly comprising the valve pistons 94, 95 downwardly to seat the valve pistons 94 and 95, since valve piston 92 has previously been moved downwardly by the existence of atmospheric pressure within inlet opening 91. The condition now is that the "top of isolator" or opening side of isolator piston 48 is pressurized, and the bottom, or inlet opening 67 of isolating chamber 49, is reduced to atmospheric pressure.

Application of pressure to the sequencing valve 51 forces the valve disc 61 to seal off the out-going air line through 66, so that momentarily atmospheric pressure remains upon the top of valve piston 76. However, with rightward movement or solator piston rod 59, ball 57 and pin 56 will be forced to move upwardly out of the recess 58, and cause thereby unseating of the valve disc 61 so as to apply tank pressure to the top of the valve piston 76. The ball-and-pin motion is predetermined by the slotted cam surface 58 provided in the piston rod 59 so that with a minimum isolating gap distance, tank pressure is communicated. This interlocks reclosure of the blast valves 271, 272 associated with the separable contact structures 12, 13 with minimum time delay.

As a result of the foregoing action valve piston 76 returns to its lower seating position to close off the atmospheric source line 87. This will then permit high pressure air from the tank 2 to pass through the opening 78 (FIG. 8B) around the differential-area valve piston 76 and to the outgoing passageway 81 to the external main contacts 11. Pressure will then be restored to the underside of contact piston 36, which will move upwardly by the equalized air pressure and by the action of compression spring 33 to the closed-contact position. As piston plunger 244 moves upwardly, it opens up the passageway 243 from tank pressure to the main interrupting contacts 12 to thereby put pressure under the main contact piston 38. This will rapidly reclose the main interrupting contacts 19, 20 by virtue of the equalized air pressure, and the presence of the compression spring 40. The main blast valve 271 will then rapidly reclose. Such action will also put pressure upon resistor contact piston 46, through check valve 274, and contact piston 46 moves upwardly by the equalized pressure, and by the spring action exerted by compression spring 253.

From the foregoing it will be apparent that there is thus provided positive equalizing of pressures to cause fast contact reclosure and fast blast-valve reclosure with a resulting shorter air blast time. As the piston stem 250 moves upwardly it opens a port 180 (FIG. 8A) to apply high pressure from the tank 2 through line 113 to piston 75 (FIG. 8D), biased by spring 111 to its upward closed position. Valve piston 75 will consequently return to its upper seated position shown in FIG. 8D. The top of the isolator 47 remains pressurized because of leakage around piston rod 59, with the bottom side thereof at 67 maintained at atmospheric pressure through the line 100. The circuit interrupter 1 has thus been opened, and isolation is maintained by the isolating contacts 16. All the other interrupting elements and the main current-carrying contacts have been reclosed, and now the breaker is in condition for a reclosing operation.

If the circuit interrupter 1 is opened for inspection or maintenance, and if a workman leaves an isolator 16 in a mid-position, or the wrong position corresponding to the index adapter valve operating valve 129 position, the main control assembly 72 will apply pressure, or atmosphere to the sides of the isolating piston 48 to move it to the correct corresponding position of the index adapter valve assembly 140. Also this provides a positive means for operating the auxiliary switch 131, the position indicator 255 and the operation counter 256. This results by applying pressure differences to the driving piston 86 of the motor for the auxiliary switch 131. The pressure differences are sensed by the connection 139 communicating with the sensing line 84 consisting of insulating tubing. This sensing line 84 connects by way of tubing 83 (FIG. 8A) to the control-valve assembly 72 (FIG. 8B).

The pressure sensing line 139 connects to the index adapter 140 and ensures against untimely or inadvertent operation of the index adapter valve assembly 140. This valve is so constructed with its index adapter such that each time it receives an electrical impulse, it reverses direction. Thus, if a closing or tripping relay were to shatter, the valve may receive a second impulse, or a closing impulse during a tripping operation. By completing the sensing connection this unwanted operation is prevented.

The index adapter 140 functions primarily by action of a control spool 162, ball detent 274 and an actuator spool 163 all moved by spring action, and pressure-and-area differences. The index adapter 140 fits between the pilot valve section 143 and the main control valve operating section 144. As shown in FIG. 14, the main valve is a three-way valve device. The pilot section 143 applies or removes pressure, as shown in FIGS. 9, 10, 12, 13 to actuate the control spool 162. Pressure for operating the actuator spool 163 is provided from the breaker pressure sensing line 139. Thus the actuator spool 163 will move only if conditions within the breaker control unit 72 are such as to require motion of the actuator spool 163. It does not matter how many times the operating coil 148 is energized. The actuator spool 163 will not move unless conditions within the breaker require it. Thus if a circuit-breaker closing operation is started, it will continue uninterruptedly by until the circuit breaker 1 is closed. The opening operation will continue similarly.

It will be noted that the main valve 144 is a normally open three-way valve.

The pressure-sensing line 139 is connected between the sequencing valve 51 and the top of the interlock valve 76. If the circuit interrupter 1 is in the open-circuit position, the sensing line 139 will be at tank pressure. The main valve 144 will be in the exhaust position so that the line 128 (FIG. 8D) and line 87 (FIG. 8B) will be at atmospheric pressure. This applies pressure differences to the piston 86 within the operating cylinder 85 (FIG. 8D) so that the auxiliary switch 131 and position indicator 255 are set up for a breaker-opening operation. Since the index adapter valve assembly 140 is deenergized, this sets up the condition shown in FIG. 13 of the drawings. If the index adapter 140 had been re-assembled so that the ball detent 274 set up the condition shown in FIG. 9, the breaker will close as pressure is built up in the breaker tank. The sensing line 139 will then change to provide atmospheric pressure, the auxiliary switch 131 will move to the closed breaker position, and all conditions will be set for an opening operation with the result that the index adapter valve assembly 140 will have the pressure conditions as shown in FIG. 9.

The operating valve coil 148 will then be given an electrical impulse to set up the condition of FIG. 10. This impulse must be sufficiently long to move the control spool 162 into the position shown in FIG. 10. This releases the actuator spool 163, which moves to the position shown in FIG. 10 by forcing the detent ball 274 into the recess of the control spool 160. The breaker will then begin motion to the open breaker position. Any repeated impulses to the control spool 162 will not change the position of the actuator spool 163, since pressure at region "G" is atmospheric.

When the circuit interrupter 1 reaches the open-circuit position, pressure at region "G" changes to tank pressure through the sensing line 139, and the auxiliary switch 131 will have changed to the open-breaker position. If no closing impulse is received, the breaker remains open with the index adapter valve assembly 140 being in the condition shown in FIG. 13 of the drawings.

If a closing impulse is made, conditions change as per FIG. 12, since the control spool 162 will be forced upwardly, and the actuator spool 163 will be moved downwardly. The breaker will then begin its closing operation, and, again, repeated impulses will not stop the closing motion since the actuator spool 163 is pressure-biased downwardly.

Closing motion pressures move the auxiliary switch 131 to deenergize the control valve coil 148 through the auxiliary switch contacts 222. After the closing operation is completed, the conditions are as set forth in FIG. 9 of the drawings.

To assist in determining the relative positions of the valves and mechanical parts of the breaker, the table set forth in FIG. 15 is presented. As shown, FIG. 15 illustrates the various conditions for a breaker closed, breaker opening, breaker fully opened and a breaker-closing operation.

It is obvious that when the disconnecting contacts 16 are in the open position, as shown in FIG. 8A the sequencing valve 51 is in the "through air" position and lines 105, 66, 83 are pressurized, as indicated in the table of FIG. 15. As a result, differential piston 76 is in its lower position and line 81 is pressurized because of the pressure opening 78 and the space around the differential piston 76. During the closing operation when the ball 57 is out of the groove 58 provided on piston rod 59, the sequencing valve 51 remains in its "through air" position and the lines 83, 84, 66 are exhausted through the open sequencing valve 51 by way of pipe 105 which is at this time in communication with exhaust opening 101 of valve control element 72.

When the closing operation is completed, the ball 57 will fall in the groove 58 to close the sequencing valve 51 permitting any leakage of pressurized gas to pass from line 66 through the sequencing valve 51 to the line 105 and hence to exhaust line 101. During the opening operation, an important function of the sequencing valve 51 is to momentarily maintain atmospheric pressure on differential piston 76 until the sequence of operation is such that the disconnecting contact 16 has separated sufficiently to prevent restriking, at which time the forcing of the ball 57 out of the groove 58 opens up the sequencing valve 51 and applies pressure from the line 105 through sequencing valve 51, line 66, line 83 to the top of differential piston 76. The consequent lowering of differential piston 76 opens up the bypassing passage through tank opening 78 and permits repressurizing of the several blast valves 271, 272 at the desired time in the opening stroke to minimize gas consumption.

From the foregoing description it will be apparent that there is provided a novel simplified electrical and pneumatic control scheme for a circuit interrupting structure. Wiring is simplified, and there is a minimum number of auxiliary relays obtained by the presented method of the overall means for breaker control. The result is fewer components, less wiring, smaller panels, an da considerably lower manufacturing cost. The present arrangement illustrates the use of a single control coil 148 and valve 129 for use in both closing and opening the circuit interrupter 1. Only a single anti-pump relay 218, shown in FIG. 16 is needed. No latch checking switches or similar devices are required. In one circuit breaker position the auxiliary switch contacts set up the closing circuit. In the other breaker position other auxiliary switch contacts set up the opening circuit. Pressure switches may be provided as indicated, either to open the breaker for falling tank pressure, or to maintain it in the closed or opened position.

FIGS. 17 and 18 illustrate an application of the principles of the present invention to a circuit-interrupting structure of lower voltage rating than that set forth in in FIGS. 1 and 2 of the drawings. With reference to FIG. 17, it will be observed that only a single arc-extinguishing assemblage 6 is associated with each pole-unit of the interrupter. The terminal bushings 257 support a conducting blade 258, the lower end of which fixedly secures into position flexible contact fingers 259, which receive the extremity of the isolating contact 16 associated with the arc-extinguishing assemblage 6 secured to the other terminal bushing 260. The pneumatic and electrical control may be identical to that previously described, and FIG. 18 illustrates the simplified arrangement of the parts and the compact dimensions. The opening and closing operation of the modified, lower voltage circuit interrupting structure 261 is identical to that previously described; consequently, further elaboration thereof appears unnecessary.

The voltage rating for the circuit interrupter 261 may, for example, be 46 kv. with a kva. rating, for example, of 3,000,000.

From the foregoing description it will be apparent that there is provided a simplified and highly efficient circuit interrupter in which the breaker closed and breaker opened positions are indicated by a pressure sensing line 84 which not only functions to operate the auxiliary switch 131, but also sets up the index-adapter valve assembly 140 to the proper position.

Although certain interrupting structures and the pneumatic and electrical control therefor have been illustrated, it is to be clearly understood that the same were merely for the purpose of illustration, and that changes and modifications may readily be made therein by those skilled in the art without departing from the spirit and scope of the invention.

We claim as our invention:

1. The combination in a compressed-gas circuit interrupter of a relatively stationary main contact, a cooperable movable main contact, a piston having a piston rod for moving said movable main contact to the open position, a first valve associated with said piston rod, a relatively stationary main arcing contact, a cooperable movable main arcing contact cooperable with the relatively stationary main arcing contact to establish a main current arc, a second piston having a second piston rod for moving said movable main arcing contact to the open position, a second valve associated with said second piston rod, a relatively stationary impedance contact, a cooperable movable impedance contact separable from the relatively stationary impedance contact to establish an impedance current arc, a third piston for opening said movable impedance contact, impedance means in series with said separable impedance contacts, means connecting said three pairs of separable contacts in electrical parallel relationship, means for exhausting the pressure on one side of said first-mentioned piston to effect thereby opening of the movable main contact, means including said first valve for exhausting the pressure on one side of said second piston to effect thereby opening of said movable main arcing contact to draw a main arc, and means including said second valve for exhausting the pressure on one side of said third piston for drawing an impedance current arc after the extinction of the main current arc.

2. A compressed-gas circuit interrupter including a grounded pressurized tank containing an arc-extinguishing gas under pressure, a pair of terminal bushings extending interiorly within said pressurized tank, an arc-extinguishing assembly associated with the interior end of one terminal bushing, the arc-extinguishing assembly including a relatively stationary main contact, a cooperable movable main contact, a piston having a piston rod for moving said movable main contact to the open position, a first valve associated with said piston rod, a relatively stationary main arcing contact, a cooperable movable main arcing contact cooperable with the relatively stationary main arcing contact to establish a main current arc, a second piston having a second piston rod for moving said movable main arcing contact to the open position, a second valve associated with said second piston rod, a relatively stationary impedance contact, a cooperable movable impedance contact separable from the relatively stationary impedance contact to establish an impedance current arc, a third piston for opening said movable impedance contact, impedance means in series with said separable impedance contacts, means connecting said three pairs of separable contacts in electrical parallel relationship, means for exhausting the pressure on one side of said first-mentioned piston to effect thereby opening of the movable main contact, means including said first valve for exhausting the pressure on one side of said second piston to effect thereby opening of said movable main arcing contact to draw a main arc, and means including said second valve for exhausting the pressure on one side of said third piston for drawing an impedance current arc after the extinction of the main current arc.

3. The combination in a fluid-blast circuit interrupter of a relatively stationary orifice-shaped contact, a cooperable movable contact separable from the relatively stationary orifice-shaped contact to establish an arc, a piston for causing opening movement of the movable contact, means for blasting a fluid radially inwardly through the orifice-shaped relatively stationary contact to effect extinction of the arc, and a magnetic shielding collar surrounding the movable contact and disposed rearwardly thereof to center the established arc and to serve as a stop for opening motion of said piston.

4. A circuit interrupter of the gas-blast type including a pressurized enclosure, an interrupting assembly biased to the closed-circuit position disposed interiorly within said pressurized enclosure, serially related disconnecting means within said enclosure opened in the fully open circuit position after the interrupting assembly has reclosed, a pneumatically-operated position-indicating device disposed adjacent the wall of said pressurized enclosure, a single insulating pneumatic sensing line extending from the interrupting assembly and the disconnecting means to said pneumatically-operated position-indicating device and pressurized and exhausted depending upon whether the interrupting assembly and the disconnecting means is in the open or closed-circuit positions, and additional means cooperating with said indicating device to actuate the same upon an exhausted condition of said sensing line.

5. A circuit interrupter of the gas-blast type including a pressurized enclosure, an interrupting assembly biased to the closed-circuit position disposed interiorly within said pressurized enclosure, serially related disconnecting means disposed within the enclosure opened in the fully open circuit position after the interrupting assembly has reclosed, a two-way interrupter control valve at line potential and associated with the interrupter assembly, an insulating control pipe alternately pressurized and exhausted connecting the high-potential two-way interrupter control valve to the wall of the enclosure, a pneumatically-operated position-indicating device disposed adjacent the wall of said pressurized enclosure, a single insulating pneumatic sensing line extending from the interrupting assembly and the disconnecting means to said pneumatically-operated position-indicating device and pressurized and exhausted depending upon whether the interrupting assembly and the disconnecting means is in the open or closed-circuit positions, and additional means cooperating with said indicating device to actuate the same upon an exhausted condition of said sensing line.

6. The combination in a compressed-gas circuit interrupter of a grounded pressurized tank, a gas under pressure within said tank supplied from an external source, a pair of terminal bushings extending into said pressurized grounded tank, at least one interrupting assembly supported at the interior end of one terminal bushing, an insulating control pipe within the tank alternately at tank pressure and atmospheric pressure, a high-potential two-way interrupter control valve actuated by the pressure conditions in said control pipe, a pneumatically-operated position-indicating device disposed adjacent the wall of said pressurized tank, a single insulating pneumatic sensing line extending from the interrupting assembly and the disconnecting means to said pneumatically-operated position-indicating device and pressurized and exhausted depending upon whether the interrupting assembly and the disconnecting means is in the open or closed-circuit positions, and additional means cooperating with said indicating device to actuate the same upon an exhausted condition of said sensing line.

7. A circuit interrupter of the gas-blast type including a pressurized enclosure, an interrupting assembly biased to the closed-circuit position disposed interiorly within said pressurized enclosure, serially related disconnecting means within said enclosure opened in the fully open circuit position after the interrupting assembly has reclosed, a pneumatically-operated position-indicating device disposed adjacent the wall of said pressurized enclosure, a single insulating pneumatic sensing line extending from the interrupting assembly and the disconnecting means to said pneumatically-operated position-indicating device and pressurized and exhausted depending upon whether the interrupting assembly and the disconnecting means is in the open or closed-circuit positions, additional means cooperating with said indicating device to actuate the same upon an exhausted condition of said sensing line, a main operating control valve including a control spool and an actuator spool, a ball detent interlocking the control and actuator spools, and said sensing line being connected to the actuator spool to effect the actuation thereof.

8. The combination in a circuit interrupter assembly of an electrically actuated main operating control valve including a control spool and an actuator spool, a ball detent interlocking the control and actuator spools, a pilot valve line for moving the control spool by alternate pressure and exhaust conditions, an arc-extinguishing structure, a control pipe alternately pressurized and exhausted, an exhaust valve pneumatically-operated by said main operating control valve, said control pipe interconnecting said exhaust valve and said arc-extinguishing structure, said arc-extinguishing structure including a two-way interrupter control valve, gas-supply means for admitting at times high pressure gas to said two-way interrupter control valve, and the movement of the actuator spool controlling pressure conditions for operating said exhaust valve.

9. The combination in a circuit interrupter assembly of an electrically actuated main operating control valve including a control spool and an actuator spool, a ball detent interlocking the control and actuator spools, a pilot valve line for moving the control spool by alternate pressure and exhaust conditions, an arc-extinguishing structure, a control pipe alternately pressurized and exhausted, an exhaust valve pneumatically-operated by said main operating control valve, said control pipe interconnecting said exhaust valve and said arc-extinguishing structure, said arc-extinguishing structure including a two-way interrupter control valve, gas-supply means admitted at times to said two-way interrupter control valve, the movement of the actuator spool controlling pressure conditions for operating said exhaust valve, and a pressure sensing line alternatively pressurized and exhausted connected to the main valve for operating said actuator spool.

10. A compressed-gas circuit interrupter including a grounded pressurized tank containing an arc-extinguishing gas under pressure, a pair of terminal bushings extending interiorly within said pressurized tank, at least one arc-extinguishing unit and serially-related disconnecting switch means situated adjacent the interior end of one of the two terminal bushings, said unit including a pair of pressure-operated separable contacts, a piston secured to one of the separable contacts and moved in the opening direction by dumping the pressure on one side thereof, a control valve assembly including a two-way interrupter control valve at high potential and constituting a part of said arc-extinguishing unit, a conduit interconnecting said two-way interrupter control valve with said one side of said piston to effect opening of said one separable contact, conduit means pneumatically interconnecting said control valve assembly with said disconnecting switch means to operate the same in timed sequence with said separable contacts, and an insulating control pipe alternately at tank pressure and at atmospheric pressure for operating said two-way interrupter control valve.

11. A compressed-gas circuit interrupter including a grounded pressurized tank containing an arc-extinguishing gas under pressure, a pair of terminal bushings extending interiorly within said pressurized tank, at least one arc-extinguishing unit and serially-related disconnecting switch means situated adjacent the interior end of one of the two terminal bushings, said unit including a pair of pressure-operated separable contacts, a piston secured to one of the separable contacts and moved in the opening direction by dumping the pressure on one side thereof, a control valve assembly including a two-way interrupter control valve at high potential and constituting a part of said arc-extinguishing unit, said two-way interrupter control valve having a movable piston valve, means defining an inlet opening from the tank to a portion of one side of said movable piston valve, a conduit interconnecting said two-way interrupter control valve with said one side of said piston to effect opening of said one separable contact, conduit means pneumatically interconnecting said control valve assembly with said disconnecting switch means to operate the same in timed sequence with said separable contacts, and an insulating control pipe alternately at tank pressure and at atmospheric pressure for operating said two-way interrupter control valve.

12. A compressed-gas circuit interrupter including a grounded pressurized tank containing an arc-extinguishing gas under pressure, a pair of terminal bushings extending interiorly within said pressurized tank, at least one arc-extinguishing unit and serially-related disconnecting switch means situated adjacent the interior end of one of the two terminal bushings, said unit including a pair of pressure-operated separable contacts, a piston secured to one of the separable contacts and moved in the opening direction by dumping the pressure on one side thereof, a control valve assembly including a two-way interrupter control valve including a differential-area valve piston, means defining an inlet opening from the tank acting upon a portion of the differential-area valve piston, an outlet portion for said two-way interrupter control valve, a conduit interconnecting said outlet portion with said one side of said piston to effect opening movement of said one separable contact, conduit means pneumatically interconnecting said control valve assembly with said disconnecting switch means to operate the same in timed sequence with said separable contacts, and a control pipe alternately at tank pressure and at atmospheric pressure for operating said two-way interrupter control valve.

13. A compressed-gas circuit interrupter including a grounded pressurized tank containing an arc-extinguishing gas under pressure, a pair of terminal bushings extending interiorly within said pressurized tank, at least one arc-extinguishing unit situated adjacent the interior end of one of the two terminal bushings, said unit including a pair of pressure-operated separable contacts, a piston secured to one of the separable contacts and moved in the opening direction by dumping the pressure on one side thereof, a two-way interrupter control valve including a differential area valve piston, means defining an inlet opening from the tank acting upon a portion of the differential-area valve piston, an outlet portion of said two-way interrupter control valve, a conduit interconnecting said outlet portion with said one side of said piston to effect opening movement of said one separable contact, a control pipe alternately at tank pressure and at atmospheric pressure for operating said two-way interrupter control valve, a two-way exhaust valve alternately at tank pressure and at atmospheric pressure for controlling the pressure status of said control pipe, and a reduction of pressure within said control pipe causing movement of said differential-area valve piston to admit tank pressure through said inlet opening to act through said conduit and effect closing of said one separable contact.

14. A compressed-gas circuit interrupter including a grounded pressurized tank containing an arc-extinguishing gas under pressure, a pair of terminal bushings extending interiorly within said pressurized tank, at least one arc-extinguishing unit situated adjacent the interior end of one of the two terminal bushings, said unit including a pair of pressure-operated separable contacts, a piston secured to one of the separable contacts and moved in the opening direction by dumping the pressure on one side thereof, a two-way interrupter control valve including a differential-area valve piston, means defining an inlet opening from the tank acting upon a portion of the differential-area valve piston, an outlet portion of said two-way interrupter control valve, a conduit interconnecting said outlet portion with said one side of said piston to effect opening movement of said one separable contact, a control pipe alternately at tank pressure and at atmospheric pressure for operating said two-way interrupter control valve, a two-way exhaust valve alternately at tank pressure and at atmospheric pressure for controlling the pressure status of said control pipe, and a reduction of pressure within said control pipe causing movement of said differential-area valve piston to admit tank pressure through said inlet opening to act through said conduit and effect closing of said one separable contact, electrical circuits for the interrupter, an auxiliary switch for controlling the electrical circuits for the compressed-gas circuit interrupter, and a pressure sensing line alternately at tank and exhaust pressures connected to the two-way interrupter control valve for operating said auxiliary switch.

15. A compressed-gas circuit interrupter including a grounded pressurized tank containing an arc-extinguishing gas under pressure, a pair of terminal bushings extending interiorly within said pressurized tank, at least one arc-extinguishing unit situated adjacent the interior end of one of the two terminal bushings, said unit including a pair of pressure-operated separable contacts, a piston secured to one of the separable contacts and moved in the opening direction by dumping the pressure on one side thereof, a two-way interrupter control valve including a differential-area valve piston, means defining an inlet opening from the tank acting upon a portion of the differential-area valve piston, an outlet portion of said two-way interrupter control valve, a conduit interconnecting said outlet portion with said one side of said piston to effect opening movement of said one separable contact, a control pipe alternately at tank pressure and at atmospheric pressure for operating said two-way interrupter control valve, a two-way exhaust valve alternately at tank pressure and at atmospheric pressure for controlling the pressure status of said control pipe, a reduction of pressure within said control pipe causing movement of said differential-area valve piston to admit tank pressure through said inlet opening to act through said conduit and effect closing of said one separable contact, a main control valve operatively associated with the circuit interrupting unit having a control spool and an actuator spool, interlock means disposed between the control and actuator spools, and the main control valve causing the operation of the two-way exhaust valve.

16. The combination in a pressurized tank-type of compressed-gas circuit interrupter of a grounded tank containing an arc-extinguishing gas under pressure, a pair of terminal bushings extending interiorly within said grounded pressurized tank, an interrupting assembly and a serially related disconnecting switch structure disposed in series relation and disposed within said pressurized tank adjacent the interior ends of the terminal bushings, a main control valve assembly disposed within the tank for correlating the respective opening and closing operations of the interrupting assembly and the disconnecting switch structure, the interrupting assembly having at least two pairs of electrically parallel separable contacts, an operating piston secured to one contact of one of the pairs of separable contacts, a second piston secured to one of the other pairs of separable contacts, the disconnecting switch structure having a movable disconnecting contact, a third operating piston secured to the movable disconnecting contact to cause the opening and closing motion thereof, said main control valve including a two-way interrupter control valve, disconnecting switch control valve and an isolator delay valve, the movement of said disconnecting switch control valve alternately subjecting said third operating piston to tank pressure or exhaust pressure for actuating said movable disconnecting contact, sequential means for dumping the pressure below the first operating piston and then at a later time dumping the pressure under the second operating piston, a pipe line interconnecting the region below the second operating piston with the isolator delay valve, a tank inlet opening associated with said isolator delay valve, a conduit interconnecting the interrupter control valve with the space below the first operating piston, a control pipe alternately at tank pressure and at exhaust pressure for operating said interrupter control valve, and means communicating the pressure in the control pipe to said disconnecting switch control valve.

17. The combination in a pressurized tank-type of compressed-gas circuit interrupter of a grounded tank containing an arc-extinguishing gas under pressure, a pair of terminal bushings extending interiorly within said grounded pressurized tank, an interrupting assembly and a serially related disconnecting switch structure disposed in series relation and disposed within said pressurized tank adjacent the interior ends of the terminal bushings, a main control valve assembly disposed within the tank for correlating the respective opening and closing operations of the interrupting assembly and the disconnecting switch structure, the interrupting assembly having at least two pairs of electrically parallel separable contacts, an operating piston secured to one contact of one of the pairs of separable contacts, a second piston secured to one of the other pairs of separable contacts, the disconnecting switch structure having a movable disconnecting contact, a third operating piston secured to the movable disconnecting contact to cause the opening and closing motions thereof, said main control valve including a two-way interrupter control valve, disconnecting switch control valve and an isolator delay valve, the movement of said disconnecting switch control valve alternately subjecting said third operating piston to tank pressure or exhaust pressure for actuating said movable disconnecting contact, sequential means for dumping the pressure below the first operating piston and then at a later time dumping the pressure under the second operating piston, a pipe line interconnecting the region below the second operating piston with the isolator delay valve, a tank inlet opening associated with said isolator delay valve, a conduit interconnecting the interrupter control valve with the space below the first operating piston, a control pipe alternately at tank pressure and at exhaust pressure for operating said interrupter control valve, means communicating the pressure in the control pipe to said disconnecting switch control valve, a double-acting exhaust valve associated with said control pipe, and means for operating said exhaust valve.

18. The combination in a pressurized tank-type of compressed-gas circuit interrupter of a grounded tank containing an arc-extinguishing gas under pressure, a pair of terminal bushings extending interiorly within said grounded pressurized tank, an interrupting assembly and a serially related disconnecting switch structure disposed in series relation and disposed within said pressurized tank adjacent the interior ends of the terminal bushings, a main control valve assembly disposed within the tank for correlating the respective opening and closing operations of the interrupting assembly and the disconnecting switch structure, the interrupting assembly having at least two pairs of electrically parallel separable contacts, an operating piston secured to one contact of one of the pairs of separable contacts, a second piston secured to one of the other pairs of separable contacts, the disconnecting switch structure having a movable disconnecting contact, a third operating piston secured to the movable disconnecting contact to cause the opening and closing motions thereof, said main control valve including a two-way interrupter control valve, disconnecting switch control valve and an isolator delay valve, the movement of said disconnecting switch control valve alternately subjecting said third operating piston to tank pressure or exhaust pressure for actuating said movable disconnecting contact, sequential means for dumping the pressure below the first operating piston and then at a later time dumping the pressure under the second operating piston, a pipe line interconnecting the region below the second operating piston with the isolator delay valve, a tank inlet opening associated with said isolator delay valve, a conduit interconnecting the interrupter control valve with the space below the first operating piston, a control pipe alternately at tank pressure and at exhaust pressure for operating said interrupter control valve, and means communicating the pressure in the control pipe to said disconnecting switch control valve, a double-acting exhaust valve associated with said control pipe, and a single-coil master control valve operatively associated with the interrupting assembly having control and actuator spools mechanically interlocked to effect operation of said double-acting exhaust valve.

19. The combination in a pressurized tank-type of compressed-gas circuit interrupter of a grounded tank containing an arc-extinguishing gas under pressure, a pair of terminal bushings extending interiorly within said grounded pressurized tank, an interrupting assembly and a serially related disconnecting switch structure disposed in series relation and disposed within said pressurized tank adjacent the interior ends of the terminal bushings, a main control valve assembly disposed within the tank for correlating the respective opening and closing operations of the interrupting assembly and the disconnecting switch structure, the interrupting assembly having at least two pairs of electrically parallel separable contacts, an operating piston secured to one contact of one of the pairs of separable contacts, a second piston secured to one of the other pairs of separable contacts, the disconnecting switch structure having a movable disconnecting contact, a third operating piston secured to the movable disconnecting contact to cause the opening and closing motions thereof, said main control valve including a two-way interrupter control valve, disconnecting switch control valve and an isolator delay valve, the movement of said disconnecting switch control valve alternately subjecting said third operating piston to tank pressure or exhaust pressure for actuating said movable disconnecting contact, sequential means for dumping the pressure below the first operating piston and then at a later time dumping the pressure under the second operating piston, a pipe line interconnecting the region below the second operating piston with the isolator delay valve, a tank inlet opening associated with said isolator delay valve, a conduit interconnecting the interrupter control valve with the space below the first operating piston, a control pipe alternately at tank pressure and at exhaust pressure for operating said interrupter control valve, and means communicating the pressure in the control pipe to said disconnecting switch control valve, a double-acting exhaust valve associated with said control pipe, a single-coil master control valve operatively associated with the interrupting assembly having control and actuator spools mechanically interlocked to effect operation of said double-acting exhaust valve, and a pressure-sensing line extending from said interrupter control valve to said actuator spool for effecting the motion thereof.

20. The combination in a pressurized tank-type of compressed-gas circuit interrupter of a grounded tank containing an arc-extinguishing gas under pressure, a pair of terminal bushings extending interiorly within said grounded pressurized tank, an interrupting assembly and a serially related disconnecting switch structure disposed in series relation and disposed within said pressurized tank adjacent the interior ends of the terminal bushings, a main control valve assembly disposed within the tank for correlating the respective opening and closing operations of the interrupting assembly and the disconnecting switch structure, the interrupting assembly having at least two pairs of electrically parallel separable contacts, an operating piston secured to one contact of one of the pairs of separable contacts, a second piston secured to one of the other pairs of separable contacts, the disconnecting switch structure having a movable disconnecting contact, a third operating piston secured to the movable disconnecting contact to cause the opening and closing motions thereof, said main control valve including a two-way interrupter control valve, disconnecting switch control valve and an isolator delay valve, said two-way interrupter control valve including a differential-area piston valve with a tank inlet opening associated with a portion of the piston area of said interrupter control valve, the movement of said disconnecting switch control valve alternately subjecting said third operating piston to tank pressure or exhaust pressure for actuating said movable disconnecting contact, sequential means for dumping the pressure below the first operating piston and then at a later time dumping the pressure under the second operating piston, a pipe line interconnecting the region below the second operating piston with the isolator delay valve, a tank inlet opening associated with said isolator delay valve, a conduit interconnecting the interrupter control valve with the space below the first operating piston, a control pipe alternately at tank pressure and at exhaust pressure for operating said interrupter control valve, and means communicating the pressure in the control pipe to said disconnecting switch control valve.

21. A circuit interrupter including a pair of separable contacts, means for opening one of said separable contacts including an operating piston movable within an operating cylinder, pressure controlling means including a master control valve having a control spool and an actuator spool, means mechanically interlocking the two spools, a pilot valve having only a single electrically actuated operating coil, and means for operatively connecting the pilot line of the pilot valve to one end of said control spool.

22. A circuit interrupter including a pair of separable contacts, means for opening one of said separable contacts including an operating piston movable within an operating cylinder, pressure controlling means including a master control valve having a control spool and an actuator spool, means mechanically interlocking the two spools, a pilot valve having only a single electrically actuated operating coil, means for operatively connecting the pilot line of the pilot valve to one end of said control spool, a pressure-sensing line associated with said separable contacts and at high pressure in one operative position of the contacts and at a lower pressure in the other operative position of the interrupter, and said pressure-sensing line being connected to one end of said actuator spool for actuating the same.

23. A circuit interrupter including a pair of separable contacts, means for opening one of said separable contacts including an operating piston movable within an operating cylinder, pressure controlling means including a master control valve having a control spool and an actuator spool, means mechanically interlocking the two spools, a pilot valve having only a single electrically actuated operating coil, means for operatively connecting the pilot line of the pilot valve to one end of said control spool, a pressure-sensing line associated with said separable contacts and at high pressure in one operative position of the contacts and at a lower pressure in the other operative position of the interrupter, said pressure-sensing line being connected to one end of said actuator spool for actuating the same, an auxiliary switch having piston means associated therewith, and said pressure-sensing line being connected to said piston means for causing the actuation of said auxiliary switch.

24. A circuit interrupter including a pair of separable contacts, means for opening one of said separable contacts including an operating piston movable within an operating cylinder, pressure controlling means including a master control valve, said master control valve including a pilot-valve section, an index-adapter section and an operating valve section, a single operating coil for operating said pilot valve section, said index-adapter section including a control spool operated by the pilot-line connection and an actuator spool mechanically interlocked with the control spool, pressure and exhaust passage means controlled by longitudinal movement of said actuator spool, a piston associated with the operating valve section and subjected to pressure and exhaust by movement of the actuator spool, and said separable contacts being closed by energizing said single operating coil and said separable contacts being opened by a second energizing of said single coil.

25. A circuit interrupter including a pair of separable contacts, means for opening one of said separable contacts including an operating piston movable within an operating cylinder, pressure controlling means including a master control valve, said master control valve including a pilot-valve section, an index-adapter section and an operating valve section, a single operating coil for operating said pilot valve section, said index-adapter section including a control spool operated by the pilot-line connection and an actuator spool mechanically interlocked with the control spool, pressure and exhaust passage means controlled by longitudinal movement of said actuator spool, a piston associated with the operating valve section and subjected to pressure and exhaust by movement of the actuator spool, a pressure-sensing line associated with said separable contacts and at a high pressure in one operative position of the contacts and at lower pressure in the other operative position of the interrupter, said pressure-sensing line being connected to one end of said actuator spool for actuating the same, and said separable contacts being closed by energizing said single operating coil and said separable contacts being opened by a second energizing of said single coil.

26. The combination in a compressed-gas circuit interrupter of a pressurized tank containing gas under pressure, a plurality of pairs of terminal bushings extending into said pressurized tank, at least one of each pair of terminal bushings being hollow for the exhaust of gas therethrough, an interrupting assembly and a disconnecting switch structure associated with the interior end of said one terminal bushing of each pair of terminal bushings, each interrupting assembly including a pair of main arcing contacts and a shunting pair of separable impedance contacts, an impedance connected in series with the separable impedance contacts, an exhaust chamber constituting a part of the interrupting assembly and forming the relatively stationary contacts of said two pairs of separable contacts, the two stationary contacts being orifice-shaped so that the gas blast under pressure from the pressurized tank can exhaust into the exhaust chamber and out through said one hollow terminal bushing, first and second pistons for respectively opening the movable main arcing contact and the movable impedance contact, pressure interlocking means whereby dumping of pressure below the first piston to cause the opening movement thereof will subsequently cause dumping of the pressure below the second piston to cause a later separation of the separable impedance contacts, a movable disconnecting contact associated with the disconnecting switch structure, a third piston for effecting the opening and closing movement of said movable disconnecting contact, a two-way acting differential-area interrupter control valve having a tank inlet opening leading to a portion of the piston area thereof, a control conduit leading from said interrupter control valve to the interrupter assembly, a control pipe leading from said interrupter control valve to the wall of the tank, and a double-acting exhaust valve disposed to said wall of the tank to control the pressure conditions within said control pipe.

27. The combination in a compressed-gas circuit interrupter of a pressurized tank containing gas under pressure, a plurality of pairs of terminal bushings extending into said pressurized tank, at least one of each pair of terminal bushings being hollow for the exhaust of gas therethrough, an interrupting assembly and a disconnecting switch structure associated with the interior end of said one terminal bushing of each pair of terminal bushings, each interrupting assembly including a pair of main arcing contacts and a shunting pair of separable impedance contacts, an impedance connected in series with the separable impedance contacts, an exhaust chamber constituting a part of the interrupting assembly and forming the relatively stationary contacts of said two pairs of separable contacts, the two stationary contacts being orifice-shaped so that the gas blast under pressure from the pressurized tank can exhaust into the exhaust chamber and out through said one hollow terminal bushings, first and second pistons for respectively opening the movable main arcing contact and the movable impedance contact, pressure interlocking means whereby dumping of pressure below the first piston to cause the opening movement thereof will subsequently cause dumping of the pressure below the second piston to cause a later separation of the separable impedance contacts, a movable disconnecting contact associated with the disconnecting switch structure, a third piston for effecting the opening and closing movement of said movable disconnecting contact, a sequencing valve associated with the disconnecting switch structure and arranged for opening in accordance with the position of said movable disconnecting contact, an interrupting valve and a disconnecting switch valve, a control pipe alternately at tank pressure and atmospheric pressure connected to said last-mentioned two valves, an exhaust duct leading to the disconnecting switch valve, and means for alternately supplying tank pressure and exhaust pressure through said control pipe to effect opening and closing operations of the interrupter.

28. The combination in a compressed-gas circuit interrupter of a pressurized tank containing gas under pressure, a plurality of pairs of terminal bushings extending into said pressurized tank, at least one of each pair of terminal bushings being hollow for the exhaust of gas therethrough, an interrupting assembly and a disconnecting switch structure associated with the interior end of said one terminal bushing of each pair of terminal bushings, each interrupting assembly including a pair of main arcing contacts and a shunting pair of separable impedance contacts, an impedance connected in series with the separable impedance contacts, an exhaust chamber constituting a part of the interrupting assembly and forming the relatively stationary contacts of said two pairs of separable contacts, the two stationary contacts being orifice-shaped so that the gas blast under pressure from the pressurized tank can exhaust into the exhaust chamber and out through said one hollow terminal bushing, first and second pistons for respectively opening the movable main arcing contact and the movable impedance contact, pressure interlocking means whereby dumping of pressure below the first piston to cause the opening movement thereof will subsequently cause dumping of the pressure below the second piston to cause a later separation of the separable impedance contacts, a movable disconnecting contact associated with the disconnecting switch structure, a third piston for effecting the opening and closing movement of said movable disconnecting contact, a sequencing valve associated with the disconnecting switch structure and arranged for opening in accordance with the position of said movable disconnecting contact, a loosely mounted valve disc associated with said sequencing valve which "floats" in the closed position of the sequencing valve, conduit means interconnecting one side of the sequencing valve with the opening side of the third piston, an interrupting valve and a disconnecting switch valve, a control pipe alternately at tank pressure and atmospheric pressure connected to said last-mentioned two valves, an exhaust duct leading to the disconnecting switch valve, and means for alternately supplying tank pressure and exhaust pressure through said control pipe to effect opening and closing operations of the interrupter.

29. The combination in a compressed-gas circuit interrupter of a pressurized tank containing gas under pressure, a plurality of pairs of terminal bushings extending into said pressurized tank, at least one of each pair of terminal bushings being hollow for the exhaust of gas therethrough, an interrupting assembly and a disconnecting switch structure associated with the interior end of said one terminal bushing of each pair of terminal bushings, each interrupting assembly including a pair of main arcing contacts and a shunting pair of separable impedance contacts, an impedance connected in series with the separable impedance contacts, an exhaust chamber constituting a part of the interrupting assembly and forming the relatively stationary contacts of said two pairs of separable contacts, the two stationary contacts being orifice-shaped so that the gas blast under pressure from the pressurized tank can exhaust into the exhaust chamber and out through said one hollow terminal bushing, first and second pistons for respectively opening the movable main arcing contact and the movable impedance contact, pressure interlocking means whereby dumping of pressure below the first piston to cause the opening movement thereof will subsequently cause dumping of the pressure below the second piston to cause a later separation of the separable impedance contacts, a movable disconnecting contact associated with the disconnecting switch structure, a third piston for effecting the opening and closing movement of said movable disconnecting contact, a main control valve means including a two-way acting differential-area interrupter control valve having a tank inlet opening leading to a portion of the piston area thereof, a disconnecting delay piston valve and a disconnecting switch valve, a duct leading from the lower side of the second piston to said disconnecting delay piston valve, a tank inlet opening associated with said disconnecting switch valve, a control conduit leading from said interrupter control valve to the interrupter assembly, a control pipe leading from said interrupter control valve to the wall of the tank, and a double-acting exhaust valve disposed at said wall of the tank to control the pressure conditions within said control pipe.

30. The combination in a compressed-gas circuit interrupter of a pressurized tank containing gas under pressure, a plurality of pairs of terminal bushings extending into said pressurized tank, at least one of each pair of terminal bushings being hollow for the exhaust of gas therethrough, an interrupting assembly and a disconnecting switch structure associated with the interior end of said one terminal bushing of each pair of terminal bushings, each interrupting assembly including a pair of main arcing contacts and a shunting pair of separable impedance contacts, an impedance connected in series with the separable impedance contacts, an exhaust chamber constituting a part of the interrupting assembly and forming the relatively stationary contacts of said two pairs of separable contacts, the two stationary contacts being orifice-shaped so that the gas blast under pressure from the pressurized tank can exhaust into the exhaust chamber and out through said one hollow terminal bushing, first and second pistons for respectively opening the movable main arcing contact and the movable impedance contact, pressure interlocking means whereby dumping of pressure below the first piston to cause the opening movement thereof will subsequently cause dumping of the pressure below the second piston to cause a later separation of the separable impedance contacts, a movable disconnecting contact associated with the disconnecting switch structure, a third piston for effecting the opening and closing movement of said movable disconnecting contact, a two-way acting differential-area interrupter control valve having a tank inlet opening leading to a portion of the piston area thereof, a control conduit leading from said interrupter control valve to the interrupter assembly, a control pipe leading from said interrupter control valve to the wall of the tank, and a double-acting exhaust valve disposed at said wall of the tank to control the pressure conditions within said control pipe, an auxiliary switch and a pressure-sensing line at exhaust pressure in the closed position of the interrupter and at tank pressure in the open position of the interrupter connected between said interrupter control valve and said auxiliary switch to effect the opening and closing motion thereof.

31. The combination according to claim 2, wherein said one terminal bushing is provided with a gas-exhausting passage for exhausting compressed gas out of said grounded pressurized tank during an opening operation.

32. The combination according to claim 4, wherein a terminal bushing extends within said pressurized enclosure and supports said interrupting assembly, and said terminal bushing provides an exhausting passage to exhaust compressed gas out of said pressurized enclosure during an opening operation.

33. The combination according to claim 5, wherein a terminal bushing extends within said pressurized enclosure and supports the interrupting assembly, and said terminal bushing providing an exhausting passage so as to exhaust compressed gas out of said pressurized enclosure during an opening operation.

34. The combination according to claim 6, wherein said one terminal bushing provides an exhausting passage so as to exhaust compressed gas from the pressurized tank to the region externally of said pressurized tank during an opening operation.

35. The combination according to claim 7, wherein a terminal bushing extends within said pressurized enclosure and supports said interrupting assembly therein, and said terminal bushing providing an exhausting passage so as to exhaust compressed gas out of the pressurized enclosure to the region externally of the enclosure during an opening operation.

36. The combination according to claim 8, wherein a pressurized grounded tank is provided, a terminal bushing extending within said pressurized tank and supports said arc-extinguishing structure, and said terminal bushing providing an exhausting passage so as to exhaust compressed gas out of said pressurized tank during an opening operation.

37. The combination according to claim 9, wherein a grounded pressurized tank is provided having a terminal bushing extending therewithin to at least partially support said arc-extinguishing structure, and said terminal bushing providing an exhausting passage so as to exhaust compressed gas from said pressurized tank to the region externally of said tank during an opening operation.

38. The combination according to claim 10, wherein said one terminal bushing provides an exhausting passage to the region externally of the pressurized tank and serves to exhaust an arc-extinguishing blast of gas externally of the tank during the opening operation.

39. The combination according to claim 11, wherein said one terminal bushing provides an exhausting passageway to the region externally of the pressurized tank, and a blast of arc-extinguishing gas exhausts through said passageway during the opening operation.

40. The combination according to claim 12, wherein said one terminal bushing provides an exhausting passageway to the region externally of the grounded pressurized tank, and a blast of arc-extinguishing gas passes through said passageway during the opening operation.

References Cited by the Examiner
UNITED STATES PATENTS

| | | | |
|---|---|---|---|
| 2,411,893 | 12/46 | Peters | 200—147 |
| 2,418,739 | 4/47 | Thumin et al. | 200—148 |
| 2,439,126 | 4/48 | Buttrey | 200—147 |
| 2,450,628 | 10/48 | Boisseau et al. | 200—82 |
| 2,459,600 | 1/49 | Strom | 200—148 |
| 2,470,628 | 5/49 | Ludwig et al. | 200—148 |
| 2,507,210 | 5/50 | Ludwig et al. | 200—148 |
| 2,568,008 | 9/51 | Jansson | 200—82 |
| 2,725,446 | 11/55 | Slepian | 200—147 |
| 2,955,182 | 10/60 | Caswell et al. | 200—148 |
| 2,965,735 | 12/60 | Baker | 200—148 |
| 2,977,446 | 3/61 | Baker | 200—148 |

KATHLEEN H. CLAFFY, *Primary Examiner.*

RICHARD M. WOOD, ROBERT K. SCHAEFER,
*Examiners.*